United States Patent
Fehrenbach et al.

(10) Patent No.: US 8,037,753 B2
(45) Date of Patent: Oct. 18, 2011

(54) SYSTEM FOR MANUFACTURING A MODULARLY STRUCTURED APPARATUS FOR DETERMINING FILLING LEVEL

(75) Inventors: Josef Fehrenbach, Haslach i.K. (DE); Jurgen Motzer, Gengenbach (DE); Karl Griessbaum, Muhlenbach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 12/545,350

(22) Filed: Aug. 21, 2009

(65) Prior Publication Data

US 2010/0000316 A1    Jan. 7, 2010

Related U.S. Application Data

(63) Continuation of application No. 10/639,697, filed on Aug. 12, 2003, now abandoned.

(60) Provisional application No. 60/403,622, filed on Aug. 13, 2002.

(51) Int. Cl.
    *G01F 23/00*    (2006.01)
(52) U.S. Cl. .......... 73/290 R; 73/295; 73/299; 73/290 V
(58) Field of Classification Search .................. 73/866.5, 73/290 R, 295, 299, 290 V
    See application file for complete search history.

(56) References Cited

U.S. PATENT DOCUMENTS

| | | | |
|---|---|---|---|
| 4,365,509 A | | 12/1982 | Cornelis |
| 4,654,646 A | * | 3/1987 | Charboneau ............... 340/450.3 |
| 4,818,994 A | | 4/1989 | Orth et al. |
| 4,918,619 A | | 4/1990 | Orloff et al. |
| 5,138,559 A | | 8/1992 | Kuehl et al. |
| 5,319,973 A | | 6/1994 | Crayton et al. |
| 5,398,711 A | * | 3/1995 | Ardrey, Jr. ...................... 137/5 |
| 5,918,194 A | | 6/1999 | Banaska et al. |
| 6,014,100 A | | 1/2000 | Fehrenbach et al. |

(Continued)

FOREIGN PATENT DOCUMENTS

DE    30 26 899    2/1982

(Continued)

OTHER PUBLICATIONS

Bush, "Tank Gauging: What is it and how is it applied?", Measurement & Control, vol. 28, No. 6, Jul./Aug. 1995, pp. 173-175.

(Continued)

*Primary Examiner* — Hezron E Williams
*Assistant Examiner* — Nashmiya Fayyaz
(74) *Attorney, Agent, or Firm* — Fay Kaplun & Marcin, LLP

(57) ABSTRACT

A system for providing different versions of a modularly structured apparatus for determining a physical process quantity, wherein at least two devices to be generated from the system are based on different measuring principles, including a number sensor units (41-48), each sensor unit being designed for detecting a determined physical measuring quantity and for converting said measuring quantity into an electrical measuring signal, wherein at least two of the sensor units are distinguished from each other by their underlying measuring principles; at least one evaluation unit (10), adapted to connect to the sensor units, for evaluating and generating a process quantity signal representing the physical process quantity from the measuring signal of a sensor unit; at least one output unit (13) for outputting the process quantity signal; at least one voltage supply unit (16); and at least one housing unit (22-24) configured to accommodate at least the evaluation unit.

15 Claims, 40 Drawing Sheets

U.S. PATENT DOCUMENTS

| | | | |
|---|---|---|---|
| 6,157,894 A | 12/2000 | Hess et al. | |
| 6,295,874 B1 | 10/2001 | Strutt et al. | |
| 6,402,031 B1 * | 6/2002 | Hall | 235/400 |
| 6,568,263 B1 * | 5/2003 | Snelling | 73/295 |
| 7,844,406 B2 * | 11/2010 | Lyon | 702/55 |
| 2004/0050157 A1 | 3/2004 | Scott et al. | |
| 2004/0055378 A1 | 3/2004 | Shost et al. | |

FOREIGN PATENT DOCUMENTS

| | | |
|---|---|---|
| GB | 2 309 471 | 7/1997 |
| WO | 01/18502 | 3/2001 |

OTHER PUBLICATIONS

"Flexible by Modularity", KROHNE, www.krohne.com, 2 sheets.

"Level-Radar BM 700, BM 70 A, BM 70P", KROHNE, Non-Contact Level Gauging Using Electromagnetic Waves, Jun. 2001, pp. 53-78, 26 sheets.

Devine, "Radar Level Measurement: The User's Guide", Burgess Hill: Vega Controls, ISBN: 095389200X, 2000, pp. 47-75.

Hauser, "Lego for Adults", MessTec, Aug. 1999, 6 sheets.

* cited by examiner

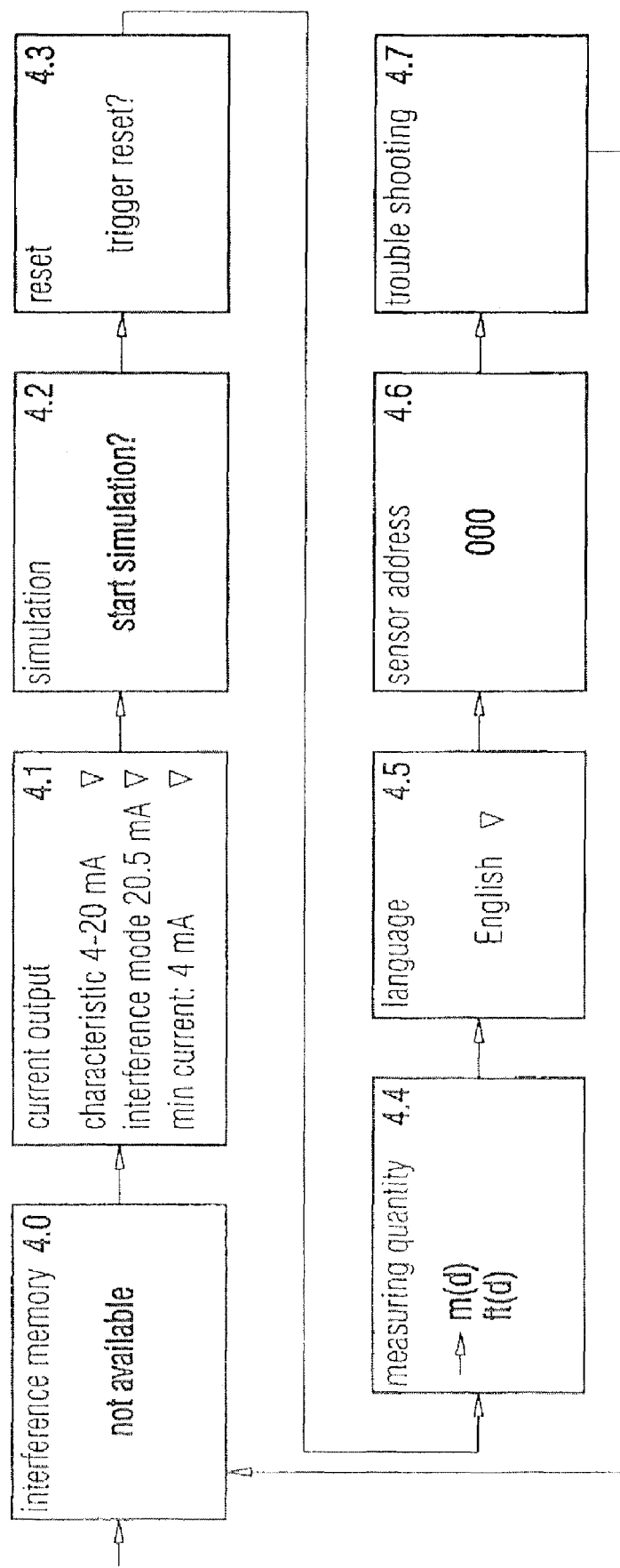

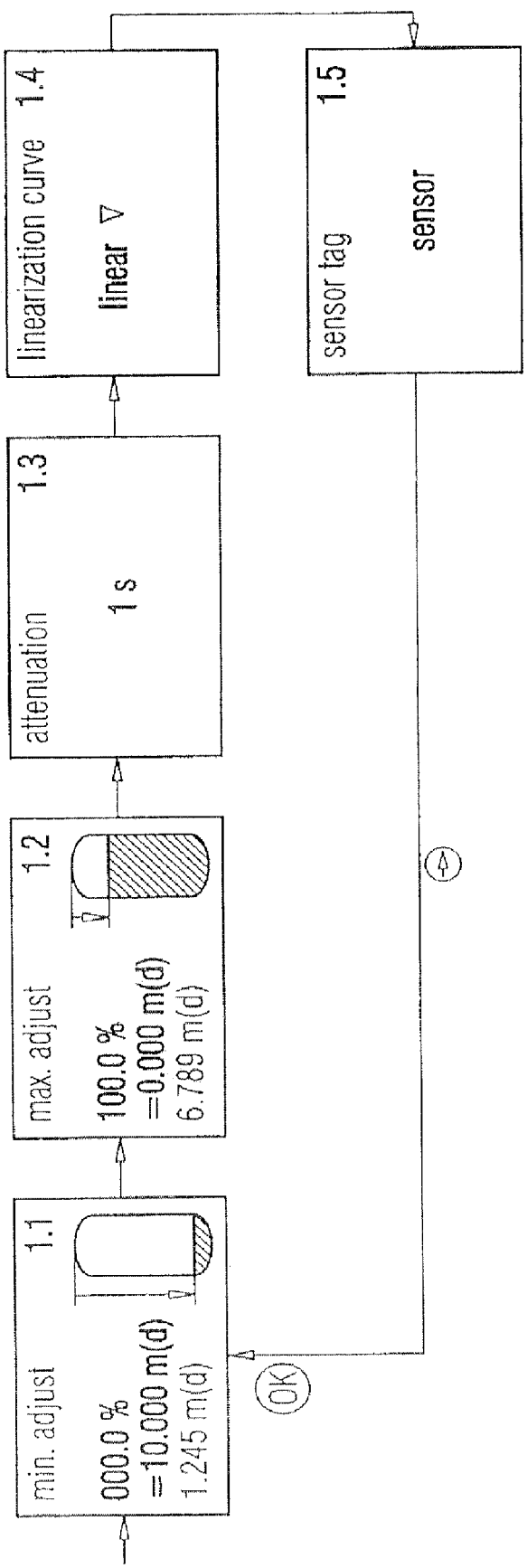

SYSTEM FOR MANUFACTURING A MODULARLY STRUCTURED APPARATUS FOR DETERMINING FILLING LEVEL

PRIORITY CLAIM

This application claims the benefit of and is a continuation of U.S. patent application Ser. No. 10/639,697 filed on Aug. 12, 2003 entitled "System for Manufacturing a Modularly Structured Apparatus For Determining a Physical Process Quantity, and Standardized Components" which claims priority to U.S. Provisional Patent Application Ser. No. 60/403,622 filed on Aug. 13, 2002.

TECHNICAL FIELD OF THE INVENTION

The present invention relates to a system for manufacturing a modularly structured apparatus for determining a physical process quantity wherein at least two devices to be generated by the system are based on different measuring principles. Moreover, the invention relates to an apparatus for determining the physical process quantity of a medium having at least one unit configured and standardized in such a way that it may be used in at least two different apparatuses for determining a physical process quantity of a medium, in which the process quantity is standardized so that it may be used in at least two different devices for determining a physical process quantity of a medium, where the process quantity is determined based on two different measuring principles. Finally, the present invention also relates to individual standardized units or components or modules for such apparatuses.

BACKGROUND OF THE INVENTION

An apparatus for determining a physical process quantity of a medium is usually also called a sensor. Such sensors are generally used in industrial processes for determining information about that process. Depending on the qualities of the physical process quantity, or the information to be obtained, various measuring principles are relied upon.

In the context of the present invention, the term "physical process quantity" is to be understood to mean, for example, the filling level of a medium in a vessel, the pressure of a medium in a vessel, the flow of a medium through a conduit, the temperature, the density of the moisture, or any other material constant of a medium. However, the present invention is not limited to the above explicitly mentioned process quantities, but is also applicable for devices for determining other physical process quantities.

The information obtained by means of various measuring methods essentially serves to monitor and to control (with or without feedback) a process. The filling level of a filling matter may thus be measured as follows: capacitive filling level measurement, filling level measurement based on a pressure measurement, filling level measurement using ultrasonic waves, filling level measurement using radar, filling level measurement using a guided microwave, filling level measurement by means of vibration and conductive filling level measurement (limit level measurement).

In capacitive filling level measurement the filling matter and the vessel are combined with a measuring probe to form an electrical capacitor. The filling level is detected by measuring the capacitor's capacitance.

In non-contact ultrasonic filling level measuring methods, ultrasonic pulses are generated. A piezo-ceramic ultrasonic transducer transmits periodic sound pulses that are reflected by the filling matter surface. Using the combined transmitting and receiving system, the filling level is computed from the measured delay of the sound.

When using a guided microwave, radio frequency microwave pulses or electrical pulses are guided along an electrical waveguide, such as a steel cable or rod. On impact with the filling matter surface, the impulses are reflected. The delay of the pulses is evaluated by the integrated electronics and output as the filling level. This method is often also known as the TDR method.

In radar based filling level measurement, the delay is measured between transmitting and receiving very short microwave pulses. Time is a measure of the filling level, while the filling matter surface directly acts as a reflector.

In the filling level measurement by means of vibration, a vibration sensor is made to vibrate using piezoelectricity. On contact with the filling matter, the vibration is attenuated. The measuring electronics detects when the limit level is reached.

Finally, in the conductive filling level measurement, when a filling matter contacts the measuring probe, a current circuit is closed and a switching command is initiated. The conductive measuring principle is for economically detecting limit levels in electrically conductive fluids.

Pressure based measuring techniques include, for example, the method using process pressure detection or using differential pressure detection. In the method using process pressure, the pressure in tube conduits or vessels is detected using an oilless metallic or ceramic measuring cell, and converted, for example, into a 4-20 mA current signal. According to the differential pressure principle, the differential pressure is measured preferably using ceramic or metal measuring cells, and converted preferably into a 4-20 mA current signal.

With filling level sensors in the sense of the present invention, a basic distinction may be made between continuously measuring sensors and limit level sensors. Limit level sensors do not determine the degree to which a vessel is full, but detect when a predefined filling state is reached.

Continuously measuring sensors use for example ultrasonic or microwave based, capacitive and pressure based measuring techniques. Limit level sensors use methods such a vibration and capacitive measuring techniques.

For fulfilling specific tasks and in view of the application conditions, a sensor must fulfill certain requirements and/or fulfill certain industrial standards. These standards comprise requirements with respect to the resistance of the sensors to rough industrial environment conditions and/or to the media to be measured. A further requirement is the ability to be attached and the adaptation of the sensors to the process. Moreover, requirements with respect to the electrical connection of the sensors, the output of the information obtained, and the adherence to certain safety rules of the sensors such as explosion protection rules ("Ex zone separation") must be met.

In order to adhere to these and other standards, a certain basic functional structure of each sensor is obtained that may be characterized by certain functional units. These are, among others, a sensor unit, an evaluation unit, an output unit, a voltage supply unit, an attachment unit, also called process connection, and a housing unit.

The sensor unit based on a mechanical or electromechanical principle, i.e. the sensor element contained therein, converts the physical measuring quantity into an electrical quantity while directly or indirectly contacting each medium. The electrical measuring signal thus generated, which is representative for each physical measuring quantity, is then further processed by the sensor electronics unit. The sensor electronics unit is a sensor specific circuit unit and must therefore be adapted to each sensor element. The sensor electronics unit processes the electrical measuring quantity signal in such a way that, for example, the electrical measuring signal is amplified, filtered and converted into a digital measuring signal.

The sensor electronics unit has a series connected evaluation unit deriving, with respect to the medium, the desired information from the measuring signal processed by the sensor electronics unit. The measured value thus generated is forwarded by the sensor via an output unit series connected after the evaluation unit to a process control system, for example, via a field bus or a two-wire loop. The sensor unit, the sensor electronics unit, the evaluation unit, and the output unit are often accommodated in a single housing and are supplied with voltage or current by a voltage supply unit also accommodated in the housing. The housing and/or the entire apparatus is attachable to a vessel or wall portion via an attachment unit, also called a process connection.

As already mentioned, each sensor must comply with a certain safety policy encompassing all these functional units. Therefore, a safety policy must be established for each sensor, taking into account different sensor components or their design.

Due to the multitude of different measuring quantities and to the measuring techniques for converting physical quantities into electrical information, it has been the usual practice to develop and manufacture for each measuring task a specific sensor with a unique design and functional units as well as mechanical components specially adapted to each measuring task. By this individual and sensor specific device development and manufacture, sensors may be provided that are optimally adapted to their measuring tasks and the application conditions.

A great disadvantage of such an approach is the high development cost and the great number of components and functional units that must be developed in connection with each sensor generation. This high development complexity, however, means high costs for manufacturers who do not specialize in a single sensor but offer a whole range of possibly related, but otherwise, different sensors. Also on the side of the users, the multitude of components and functional units may contribute to an increase in the cost required if, for example, the operation or the attachment of each sensor is different.

In our view, an apparatus for determining a physical process quantity should be known from U.S. Pat. No. 6,295,874 B1 and the associated WO 01/18502 A1, in which the process quantity is determined using a delay method. The apparatus shown herein may comprise an evaluation unit which is to be essentially independent of the sensor used. In our view, however, said document teaches the use of a sensor operating on the delay principle. Moreover, a communication unit independent of each sensor is used for data exchange with a remote process control. It must be recognized, however, that the communication unit is intended to be combined with a sensor based on the principle of delay measurement.

A prospectus of the German firm Krohne/Deutschland does show a modular structure of a filling level radar sensor, wherein various sensor units of a filling level radar sensor, such as horn antenna, wave guide or wave stick are combined, using a spacer, with two different sensor housings containing the respective electronics. Again, according to the technical understanding of the inventors, only a certain variability in the manufacture of a filling level radar sensor is taught.

Finally, the integration of absolutely oilless measuring cells in a modular system of process connections, housings, signal transmission methods, matching approaches, combined with the convenience of use provided by an intelligent system of operation are known from an offprint entitled "Lego für Erwachsene" ("Lego for grownups") by Rolf Hauser, in the journal *Messtechnik, Steuern, Regeln, Automatisieren, Messen*, August 1999. In it various pressure sensors are presented that can be combined with different housings. Again, modularity seems to be limited to one measuring principle only.

Finally, in order to provide a better explanation and understanding of the present invention, a definition of terms used in the present specification is given. The present definitions will provide at least a rough idea for interpreting the units and components of a sensor described. For interpreting the terms, however, the technical knowledge and the insight of a person skilled in the art in the field on which the present invention is based may also be necessary.

Sensor:

An entire apparatus for determining a physical process quantity of a medium. A sensor may be, for example, an apparatus ready for attachment or operational for determining a physical process quantity of a medium.

Sensor Element:

An element directly or indirectly contacting the medium to be measured in order to sense the desired physical process quantity. This may be an electromechanical element comprising, for example, one or more assemblies or components for converting a physical process quantity into an electrical signal. The conversion may also conceivably be carried out under the influence of an electrical excitation. Sensor elements include various antennas (horn antenna, rod antenna, patch antenna and the like), cable or rod probes for TDR, tuning forks with piezo drive, pressure measuring cells, differential pressure measuring cells, cable or rod probes for capacitive measurement and ultrasonic transducers.

Sensor Electronics Unit:

An electronic assembly, such as a circuit with electronic components, possibly including associated software for processing the electric signal from the sensor element and deriving a measured value that characterizes the process quantity.

Examples for a sensor electronics unit and its components for each measuring technique are listed below:

a. Radar: transmitting pulse generator, sensing pulse generator, frequency control for clock oscillators, sampling receiver, amplifier, filter, logarithmic amplifier, A/D converter, ECHOFOX software implemented on micro-controller system, b. Ultrasonic: transmitter, receiver (amplifier, filter), logarithmic amplifier, A/D converter, ECHOFOX software implemented on micro-controller system, c. TDR: transmitting pulse generator, sensing pulse generator, frequency control for clock oscillators, sampling receiver, amplifier, filter, A/D converter, ECHOFOX software implemented on micro-controller system, d. Vibration: oscillator, amplifier, filter, frequency or amplitude discriminator, A/D converter, e. Process pressure, differential pressure: capacitance/voltage converter, A/D converter, f. capacitive sensor: capacitance/voltage converter, A/D converter.

Sensor Unit:

A unit or assembly comprising a sensor element and a sensor electronics unit.

Evaluation Unit:

An electronics assembly, such as a circuit with electronic components and associated software for processing the measured value characterizing the process quantity to obtain an output value representing the same process quantity or a physical process quantity derived from it. An evaluation unit can carry out, for example, empty/full adjustments, linearization, scaling, sensor diagnosis and generating error messages. All above-mentioned activities of an evaluation unit can be implemented as software elements on a micro-controller system.

Output Unit:

An electronics assembly such as a circuit with electronic components and associated software for outputting at least the output value as well as other existing information (e.g. on the functional status of the sensor itself). The output unit can be expanded to provide an input and output unit, additionally enabling the input of, for example, adjustment values and parameters for functional optimization of the sensor. In this case, this could also be called a communication unit, comprising, for example, a digital communication, preferably within a bus system, between the sensor and the periphery. An output unit can include a current output of between 4 and 20 mA, a relay, an IIC interface, various modems (HART, PA, FF etc.). Corresponding communication protocols (HART, PA, FF etc.) can be implemented on a micro-processor system.

Voltage Supply Unit:

An electronic assembly such as a circuit with electronic components and associated software for converting the electrical energy supplied from the outside into energy of suitable electrical voltage sources for supplying the remaining electronic units of the sensor.

Display Unit:

An electronic assembly of the sensor for displaying the output value and perhaps further data such as indications on the operational status of the sensor etc.

Operation Unit:

An electronic assembly of the sensor for inputting at least one value such as an adjustment value.

Display and Operation Unit:

A generic term for a unit comprising at least one display unit or operation unit. In one exemplary embodiment, this unit comprises both a display unit and an operation unit in a common assembly.

Physical Process Quantity:

A physical characteristic of the process which is to be determined and output by the sensor (example: pressure, filling level, temperature, flow).

Physical Measuring Quantity:

A physical quantity of the process that is directly measured. It can either be identical to the physical process quantity or may allow the physical process quantity to be derived from it. For example, in hydrostatic filling level measurement the pressure is the physical measuring quantity.

Electrical Measuring Quantity:

An electrically measurable quantity of the sensor element e.g. the capacitance value provided by a capacitive pressure measuring cell when a pressure is applied to it.

Measuring Principle:

Characterized by the physical measuring quantity. In summary, the following measuring principles may be distinguished for the purposes of the present invention: a) delay measurement of freely radiated or guided waves reflected on a filling matter, such as electromagnetic waves or ultrasonic waves, b) measurement of a capacitance of a filling matter, c) measurement of a pressure or differential pressure, d) limit level measurement by means of vibration or in a conductive way, e) temperature measurement.

Measuring Technique (Sensorics)

Characterized by the electrical measuring quantity or the manner in which the electrical measuring quantity is obtained and evaluated. A further feature of the measuring technique is the functional operation of the sensor element.

In the following, exemplary embodiments of sensors and their different characteristic quantities explained above have been listed in the table below.

| Sensor | physical process quantity | physical measuring quantity | electrical measuring quantity | measuring principle | measuring technique |
|---|---|---|---|---|---|
| radar filling level sensor | filling level (continuous) | reflector-sensor distance | delay of microwaves | distance measurement | measurement of the delay of radiated microwaves |
| ultrasonic filling level sensor | filling level (continuous) | reflector-sensor distance | delay of ultrasonic waves | distance measurement | measurement of the delay of radiated ultrasonic waves |
| hydrostatic pressure sensor | filling level (continuous) | pressure of a liquid column | capacitance of a capacitive pressure measuring cell | pressure measurement | capacitance measurement in a measuring cell |
| capacitive sensor | filling level (continuous or limit level) | electrical capacitance between probe and vessel | electrical capacitance between probe and vessel | capacitance measurement | capacitance measurement using a probe |
| vibration sensor | filling level (limit level) | effect of the filling matter on mechanical vibrators | dampening or frequency offset of a mechanical vibrator | vibration measurement of a mechanical vibrator | measurement of dampening or frequency offset of a vibration |

SUMMARY OF THE INVENTION

According to a first aspect of the present invention, a system for manufacturing different versions of a modularly structured apparatus for determining a physical process quantity is provided, wherein at least two devices to be generated from the system are based on different measuring principles. The system can comprise: a number of sensor units, one sensor unit each being configured for detecting a certain physical measurement quantity and for converting said measurement quantity into an electrical measurement signal, and wherein at least two of said number of sensor units are distinguished from one another by the measuring principle they are based upon; at least one evaluation unit for evaluating and generating a process quantity signal representing the physical process quantity from the measuring signal of a sensor unit, the evaluation unit being configured and standardized to be connected to one or more of said sensor units; at least one output unit for outputting the process quantity signal, the output unit being configured and standardized to be connected to one or more of said evaluation units; at least one voltage supply unit for supplying voltage to the apparatus for determining a physical process quantity, the voltage supply unit being configured and standardized to supply voltage to one or more versions of a modular apparatus; at least one housing unit configured and standardized to accommodate one or more units from the group of units comprising at least said evaluation unit, said output unit and said voltage supply unit; and a number of attachment units to attach the apparatus for determining a physical process quantity at a vessel or wall portion, the attachment units being different depending on conditions on each vessel or wall portion. In the system according to this aspect of the invention, at least one unit from the group of units comprising said evaluation unit, said output unit, said voltage supply unit, said housing unit and said attachment unit is configured and standardized in such a way that it is usable in at least two different apparatuses for determining a physical process quantity having different sensor units distinguished by the measuring principle they are based upon.

In an exemplary embodiment of the system of the present invention, said sensor unit further includes at least one sensor electronics unit for electronically processing the electrical measuring signal of a sensor element, for example, to a digital measuring signal. To accomplish this, at least one of said sensor electronics units may be configured and standardized in such a way that it may be connected to two differing sensor elements, based in particular on two different measuring principles.

In a further exemplary embodiment of the system of the present invention, said sensor electronics unit and said evaluation unit are integrated in one module.

In a further exemplary embodiment of the system of the present invention, said sensor electronics unit and said evaluation unit are accommodated on one or more printed circuit boards.

In a further exemplary embodiment of the system according to the present invention, said at least one housing unit is configured and standardized to accommodate at least a plurality of units from the group of units comprising said at least one sensor electronics unit, said evaluation unit, said output unit and said voltage supply unit.

In a further exemplary embodiment of the system of the present invention, the number of differing sensor units for determining a certain physical measuring quantity comprises at least two differing sensor units based upon different measuring principles, such as delay measurement of freely radiated or guided waves reflected on a filling matter, such as electromagnetic waves or ultrasonic waves, measurement of a capacitance of a filling matter, measurement of a pressure or of a differential pressure, limit level measurement by means of vibration or in a conductive way, temperature measurement.

In a further exemplary embodiment of the system of the present invention, a plurality of housing units are present, each individually designed for a specific purpose of use but configured and standardized for coupling with a plurality of or all sensor units of the system.

In a further exemplary embodiment of the system of the present invention, the housing units are distinguished by the material used.

In a further exemplary embodiment of the system of the present invention, the housing units are distinguished by connection configurations for remote transmission links.

In a further exemplary embodiment of the system of the present invention, the individual sensor units of said number of sensor units are individually designed for a specific unique purpose, but configured and standardized for coupling with a plurality of or all housing units of the system.

In a further exemplary embodiment of the system of the present invention, said sensor unit may be selected from the group comprising a plurality of the following components:

a) a horn, rod or patch antenna and associated electronics for transmitting and receiving microwaves, b) a sound transducer and associated electronics for transmitting and receiving ultrasonic waves, c) a cable or rod probe and associated electronics for guiding microwaves, d) a tuning fork and associated electronics, e) a capacitive measuring probe and associated electronics, f) a temperature sensor and associated electronics, g) a pressure measuring cell and associated electronics, h) a differential pressure measuring cell and associated electronics.

In a further exemplary embodiment of the system of the present invention, said output unit is configured for signalling the process quantity with a relay.

In a further exemplary embodiment of the system of the present invention, said output unit is configured for digital communication in a bus system.

In a further exemplary embodiment of the system of the present invention, said output unit is configured for communication using two-wire technology.

In a further exemplary embodiment of the system of the present invention, the system comprises a plurality of voltage supply units, individually designed using two-wire technology, four-wire technology or for coupling with a bus system, the differing voltage supply units having standardized dimensions for connection in one of the versions of said modular apparatuses.

In a further exemplary embodiment of the system of the present invention, one of the voltage supply units is designed such that units connected in series with it may be supplied with a voltage of 3V, 5V or 15V.

In a further exemplary embodiment of the system of the present invention, the system further comprises a display and operating module configured and standardized so as to be detachably mounted on at least a plurality of different housing units.

In a further exemplary embodiment of the system of the present invention, said display and operating module comprises an attachment means and an electrical connection means, said attachment means being able to be coupled with a standardized receiving means at said housing units, and said electrical connection means being able to be paired with a corresponding electrical connection means on said housing units.

In a further exemplary embodiment of the system of the present invention, said display and operating module may be detachably mounted in different positions or orientations on said housing units.

In a further exemplary embodiment of the system of the present invention, one or more software modules for operating one of said units from the group of units comprising at least said sensor electronics unit, said evaluation unit, said output unit and said voltage supply unit for use in at least two different versions of said modularly structured apparatuses for determining a physical process quantity.

According to a second aspect of the present invention, an apparatus for determining a physical process quantity is provided, comprising: a sensor unit having a sensor element for detecting a physical measuring quantity and for converting said measuring quantity into an electrical measuring signal, an evaluation unit for evaluating and generating a process quantity signal representing a physical process quantity from the electrical measuring signal of said sensor unit, an output unit for outputting said process quantity signal, a voltage supply unit for supplying voltage to said apparatus for determining said physical process quantity, a housing unit configured for accommodating at least a plurality of units from the group of units comprising said evaluation unit, said output unit and said voltage supply unit, and an attachment unit for mounting said apparatus for determining said physical process quantity to a vessel or wall portion. At least one unit from the group of units comprising said evaluation unit, said output unit, said voltage supply unit, said housing unit and said attachment unit is configured and standardized in such a way that it is usable in apparatuses for determining a physical process quantity having different sensor units that differ in the measuring principle they are based upon.

In a first exemplary embodiment of an apparatus according to the present invention, a sensor electronics unit for electronically processing said electronic measuring signal of said sensor element, for example, into a digital measuring signal is connected between the sensor unit and the evaluation unit.

In a further exemplary embodiment of an apparatus according to the present invention, the standardization of the units refers to the mechanical connections of the units among each other.

In a further exemplary embodiment of an apparatus according to the present invention, the standardization of the units refers to the electrical interconnections of the units among each other.

In a further exemplary embodiment of an apparatus according to the present invention, said voltage supply unit is selectable from a group of standardized voltage supply units, the group of standardized voltage supply units comprising at least one voltage supply unit for connection using two-wire technology, a voltage supply unit for connection using four-wire technology and a voltage supply unit for connection to a bus system, and said diverse voltage supply units having standardized dimensions for connection in one of the versions of said modular apparatuses.

In a further exemplary embodiment of an apparatus according to the present invention, said housing unit comprises a receiving portion having electrical and mechanical connections in which a display and operating module may be detachably mounted.

In a further exemplary embodiment of an apparatus according to the present invention, said evaluation unit is configured and standardized in such a way that it is operable with sensor units working on the basis of different measuring principles.

In a further exemplary embodiment of an apparatus according to the present invention, said output unit is configured and standardized in such a way that it is operable with sensor units working on the basis of different measuring principles.

In a further exemplary embodiment of an apparatus according to the present invention, the output unit includes at least one IIC bus interface, to which a display and operating unit or a computer is connectable.

According to a further aspect of the present invention, a housing unit of an apparatus for determining a physical process quantity is suggested, the housing unit being configured and standardized in such a way that it may be coupled to either of a first sensor unit or a second sensor unit. The first sensor unit for detecting a certain physical measuring quantity and for converting said measuring quantity to an electrical measuring signal is based on a first measuring principle, whereas the second sensor unit for detecting a certain physical measuring quantity and for converting said measuring quantity to an electrical measuring signal is based on a second measuring principle distinguished from the first measuring principle.

A housing unit for example can surround all electrical functional elements and can protect these against possible environmental and ambient influences.

In a further exemplary embodiment of a housing unit according to the present invention, said housing unit accommodates at least a plurality of units from the group of units comprising at least an evaluation unit, an output unit and a voltage supply unit.

In a further exemplary embodiment of a housing unit according to the present invention, said housing unit includes a receiving means for detachably mounting a display and operating module.

In a further exemplary embodiment of a housing unit according to the present invention, said receiving means is configured in such a way that said display and operating module can be detachably mounted in different positions on the housing unit.

According to a further aspect of the present invention, an evaluation unit for an apparatus for determining a physical process quantity is suggested, the evaluation unit being configured and standardized in such a way that it may be coupled to either of a first sensor unit or a second sensor unit. Again, the first sensor unit for detecting a certain physical measuring quantity and for converting said measuring quantity to an electrical measuring signal is based on a first measuring principle, whereas the second sensor unit for detecting a certain physical measuring quantity and for converting said measuring quantity to an electrical measuring signal is based on a second measuring principle. As mentioned before, the first and second measuring principles are distinguished from one another.

According to a further aspect of the present invention, an output unit for an apparatus for determining a physical process quantity is suggested, the output unit being configured and standardized in such a way that it may be coupled to either of a first sensor unit or a second sensor unit. Again, the first sensor unit for detecting a certain physical measuring quantity and for converting said measuring quantity to an electrical measuring signal is based on a first measuring principle, whereas the second sensor unit for detecting a certain physical measuring quantity and for converting said measuring quantity to an electrical measuring signal is based on a second measuring principle. As mentioned above, the first and second measuring principles are distinguished from one another.

According to yet a further aspect of the present invention, a voltage supply unit for an apparatus for determining a physical process quantity is provided, the voltage supply unit being configured and standardized in such a way that it may be coupled to either of a first sensor unit or a second sensor unit. Yet again, the first sensor unit for detecting a certain physical measuring quantity and for converting said measuring quantity to an electrical measuring signal is based on a first measuring principle, whereas the second sensor unit for detecting a certain physical measuring quantity and for converting said measuring quantity to an electrical measuring signal is based on a second measuring principle. In the same manner as mentioned above, the first and second measuring principles are distinguished from one another.

Thus, for the first time, according to a first basic aspect of the present invention, a modular structure, working across measuring principles, of an apparatus for determining a physical process quantity is suggested. This can help to create a kind of platform for manufacturing such apparatuses, thereby simplifying the development and manufacture of various sensors and their components. Both the developer and the user will be able to sensibly combine, depending on the measuring task at hand, the field of use, the ambient conditions as well as further marginal conditions, certain units with one another along the lines of a "modular system" without being bound to the underlying measuring principle, as has previously been the case. The functional distribution of the individual units does not necessarily have to correlate with the division into respective software modules.

An advantage of the present invention is that the development time and the cost of the development of new sensors can be reduced, also possibly allowing the cost of manufacture of apparatuses based on differing measuring principles for determining a physical process quantity to be minimized.

An attachment unit or process connection can comprise a flange or a thread. In the flange configuration, the entire sensor is bolted to a corresponding counter flange of a vessel. Another example for a process connection is a screw-in thread allowing the sensor to be screwed into and attached at a counter thread of the vessel. Since the process connection generally closely correlates with the housing, it has become possible for the first time in the context of the present invention for the mechanical interfaces of each the two units to be matched to each other and standardized. The process connection, however, can be part of the housing or securely attached to it. An attachment unit can be configured and standardized for connection to one or more units of the above-mentioned type.

The mechanical or electromechanical sensor element can be mounted in or on the housing, and interacts with the medium whose physical process quantity is to be determined. Often it is also combined with the process connection in such a way that it protrudes into the vessel or is adjacent to the vessel wall. The sensor element converts the process quantity of the medium to be determined into an electrical measuring quantity.

The process quantity signal determined in one of the above described ways can for example be sent to an evaluation unit, for example, via a standardized interface of a sensor electronics unit. The sensor electronics unit is a sensor specific circuit component and therefore must be matched to each sensor element. The sensor electronics unit includes hardware and possibly software for converting the primary electrical measuring quantities in a standardized electrical measuring quantity.

For the purposes of standardization the sensor electronics unit may for example include a microprocessor with periphery (RAM, ROM, EEPROM, A/D converter), diverse filters or an amplifier. The processing and standardization of signals can be carried out exclusively using hardware components or after analog-digital conversion on a digital level in the form of a program flow of the microprocessor.

Since most sensor elements only output an electrical signal when they are motivated to do so, this motivation is given by means of an excitation signal from the sensor electronics unit. For this purpose, the sensor electronics unit is additionally provided with a signal generating apparatus, such as an oscillator or a transmitter.

The measured value standardized by the sensor electronics unit is then converted by the evaluation unit into the desired information about the process quantity and forwarded to the output unit as an electrical signal. For this purpose, sensor specific calibration and adjustment values are stored in the evaluation unit's EEPROM, allows the microprocessor to determine the physical process quantity. This evaluation is carried out preferably with the aid of a program flow on the basis of a microprocessor hardware.

In order to calibrate and adjust a sensor for a specific measuring task, calibration and adjustment values are communicated to the sensor via the output unit which, in this case, has to be extended to provide an input and output unit, or via an operating unit or display and operating unit, where they can be permanently stored in the EEPROM.

The input and output unit is for outputting the desired information that the sensor determines and for inputting the above calibration and adjustment values, or for parametrizing the sensor. In the most basic case, the output unit has an interface for connecting the sensor to the usual field bus system. Via this field bus system, the sensor is connected, for example, to a process control.

The voltage supply unit is for transforming the electrical supply voltage of the sensor, supplied, for example, by an external supply unit within the process control system, into suitably stabilized voltages (e.g. 3V, 5V and 15V) necessary for supplying the electrical functional units of the sensor.

The overall concept of the sensor is subject to certain safety guidelines, such as the regulations for avoiding explosions (Ex zone protection). This safety policy encompasses all functional units and may be implemented in various ways. Depending on the mode of implementation, there are certain requirements for different functional units of the sensor, e.g. requirements for the housing or a limitation of the power consumed by the electrical circuits. Now for the first time, according to the invention, relevant housing configurations, circuit components etc. can be uniformly designed across measuring principles to satisfy these safety requirements.

The present invention could prove to be particularly advantageous in that, by the combination of a sensor unit with the desired process connection and each housing, the development and later manufacture of various filling level and other measuring sensors have a common basis. Again, a great advantage of the present invention could reside in that, for apparatuses or sensors based on different measuring principles, components could be relied upon that are sometimes independent of each measuring principle used.

A further advantage that can be obtained by the modular structure of an apparatus across measuring principles is that the time needed to assemble a sensor could be substantially shortened, which in turn would lead to cost savings.

Furthermore, it may turn out to be advantageous for a user of different kinds of sensors based on different measuring principles that, according to the present invention, sensors can be provided with a uniform external appearance, and wherein the connection as well as the operational concept of the sensors may be unified.

BRIEF DESCRIPTION OF THE DRAWINGS

To provide a more complete understanding and for further explanation several exemplary embodiments of the present invention will be described in the following with reference to the accompanying drawings, in which:

FIG. 10d shows a further submenu of the overview shown in FIG. 10;

FIG. 11a shows a submenu of the overview shown in FIG. 11;

Please note that throughout the drawings, like parts, components or units are designated with like reference numerals.

DESCRIPTION OF EXEMPLARY EMBODIMENTS OF THE PRESENT INVENTION

Figure 1:
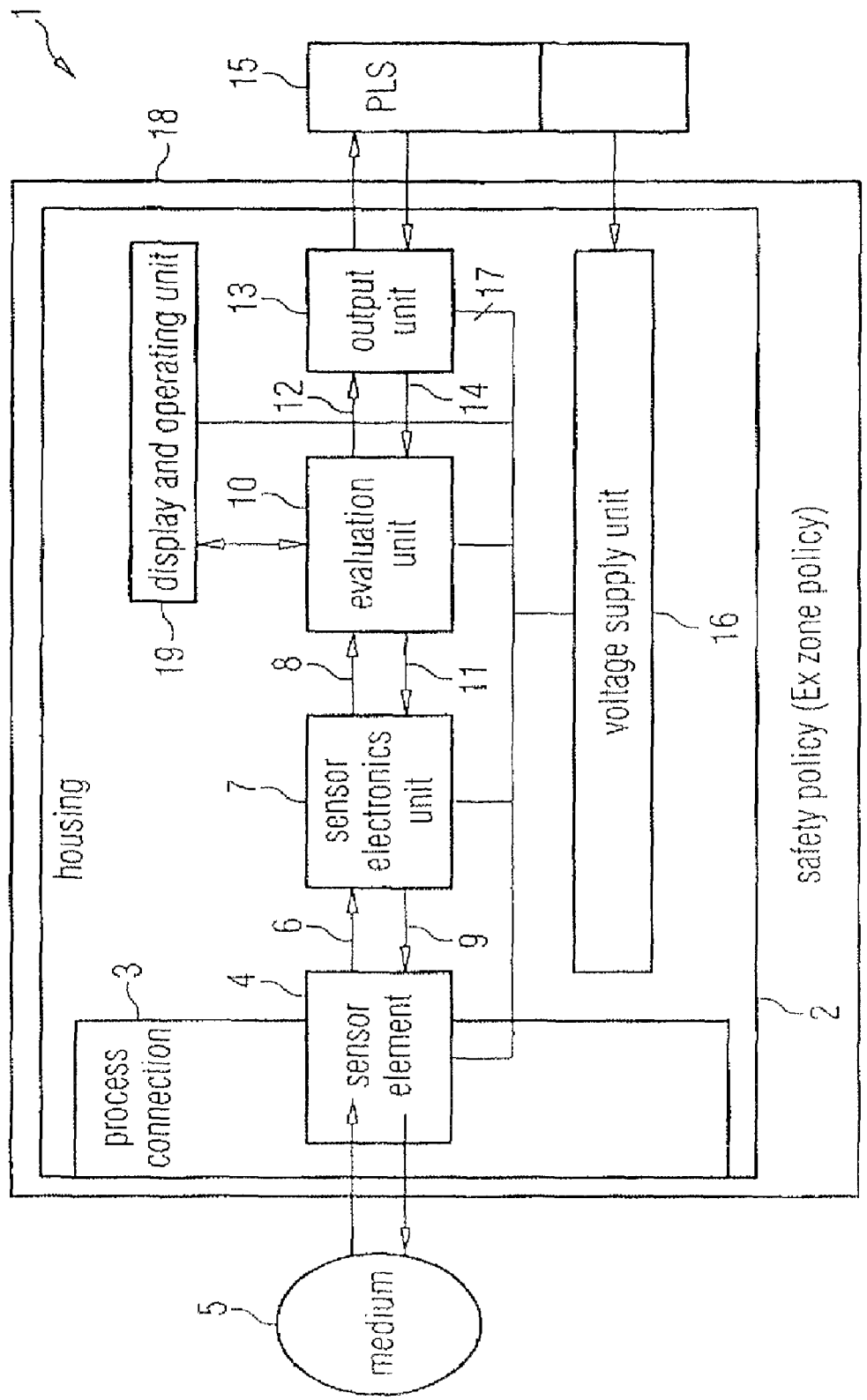
FIG. 1 shows a standardized general structure of a sensor according to the present invention.

FIG. 1 schematically shows the general structure of a modularly structured apparatus 1 for determining a physical process quantity, a sensor in short, according to the present invention. The housing 2 contains all electrical functional units and protects them against environmental influences as well as against chemical or mechanical aggression by the filling matter. At the housing 2, the process connection 3 (attachment unit) is mounted or integral with it. The process connection 3 is for adapting the sensor to its measuring environment. When mounting the sensor 1 on a vessel, the process connection 3 can be, for example, a flange that will be bolted on a counter flange of the vessel. Another embodiment of a process connection 3 is a screw-in thread used for screwing the sensor 1 into, and connecting it with, a counter-thread of a vessel. The process connection 3 is essentially a mechanical component and must therefore always be considered in close connection to the housing 2. As mentioned above, the process connection 3 may be part of the housing 2 or securely attached to it.

A mechanical or electromechanical sensor element 4 is mounted in or on the housing 2 and interacts with the medium whose physical process quantity is to be determined. In order for the process quantity to be determined, the sensor element 4 converts the physical measuring quantity of the medium 5 into an electrical measuring signal 6. Since the sensor element 4 will interact in a particular way with the medium 5 depending on the measuring technique utilized, whether it be by direct contact or by transmitting and receiving signals, it is mounted in a housing opening or outside of the housing 2. The sensor element 4 may also be combined with the process connection 3 so that it protrudes into the vessel or is adjacent to the vessel wall when mounted.

The electrical signal 6 of the sensor element 4 is further processed by the sensor electronics unit. The sensor electronics unit 7 is a sensor specific circuit component and contains hardware and, if necessary, also software for converting the primary electrical signal 6 into a standardized electrical measured value 8. As described above, for this purpose the sensor electronics unit 7 has a microprocessor with associated periphery (RAM, ROM, EEPROM, analog-digital converter), amplifier, filter and further peripheral units.

Many sensor elements 4, however, only emit an electrical signal when motivated to do so by an excitation signal 9 from the sensor electronics unit 7. For this purpose, for example the sensor electronics unit 7 can additionally include, for example, signal generating apparatus, such as an oscillator or transmitter.

The measured value 8 standardized by the sensor electronics unit 7 is then converted by the evaluation unit 10 to the desired information about the process quantity and forwarded to the output unit 13 as an electrical signal 12. For this purpose, sensor specific calibration and adjustment values are stored in the evaluation unit's 10 EEPROM and communicated to the evaluation unit 10 by means of the output unit 13, preferably as a digital signal 14, thereby helping the microprocessor to determine the process quantity. This evaluation is preferably carried out using a program flow on the basis of a microprocessor hardware.

The output unit 13 is for outputting the desired information determined by the sensor and, when complemented to provide an input and output unit, for inputting the above-mentioned calibration and adjustment values or for parametrizing the sensor 1. In the most basic case, the output unit 13 has an interface for connecting the sensor 1 to the usual field bus system. Via this field bus system, the sensor 1 is connected, for example, to the process control 15.

The voltage supply unit 16 is for transforming the electrical supply voltage of the sensor 1, supplied, for example, by an external supply unit within the process control system 15, into suitably stabilized voltages 17 (e.g. 3V and 5V) necessary for supplying the electrical functional units of the sensor 1.

The overall concept of the sensor 1 is subject to certain safety guidelines, such as the regulations for avoiding explosions (Ex zone protection). This safety policy encompasses all functional units and may be implemented in various ways. Depending on the mode of implementation, there are certain requirements for the different functional units of the sensor 1, e.g. requirements for the housing 2 or a limitation of the power consumed by the electrical circuits.

When implementing the modular structure of a sensor platform of the present invention, particular care must be taken to achieve a sensible distribution of the electrical components in the individual functional units in hardware components or assembled PCBs. A central hardware element in this context is the microprocessor able to carry out program flows from a plurality of different functional units, e.g. the sensor electronics unit 7, the evaluation unit 10 and the output unit 13. Thus, the micro-controller accesses different functional units. It can be seen that the functional distribution of FIG. 1 does not necessarily correlate with the distribution into hardware components forming the component parts for assembling a sensor 1. By suitably combining certain functional units in a hardware unit, the individual hardware components necessary for assembling a sensor platform of the present invention are obtained. For this combination of functional units in hardware components, certain functional units may also be split up between different hardware components.

After this assignment of the functional units to hardware components, the modular system is now defined for the assembly of a modularly structured sensor platform according to the present invention. The partitioning of the functional units in hardware components and their distribution to software components, however, are basically independent of each other. While the partitioning of the hardware components results in the individual physical components of the sensor, the distribution of the software components reflects individual functional units or parts of functional units.

Figure 2:
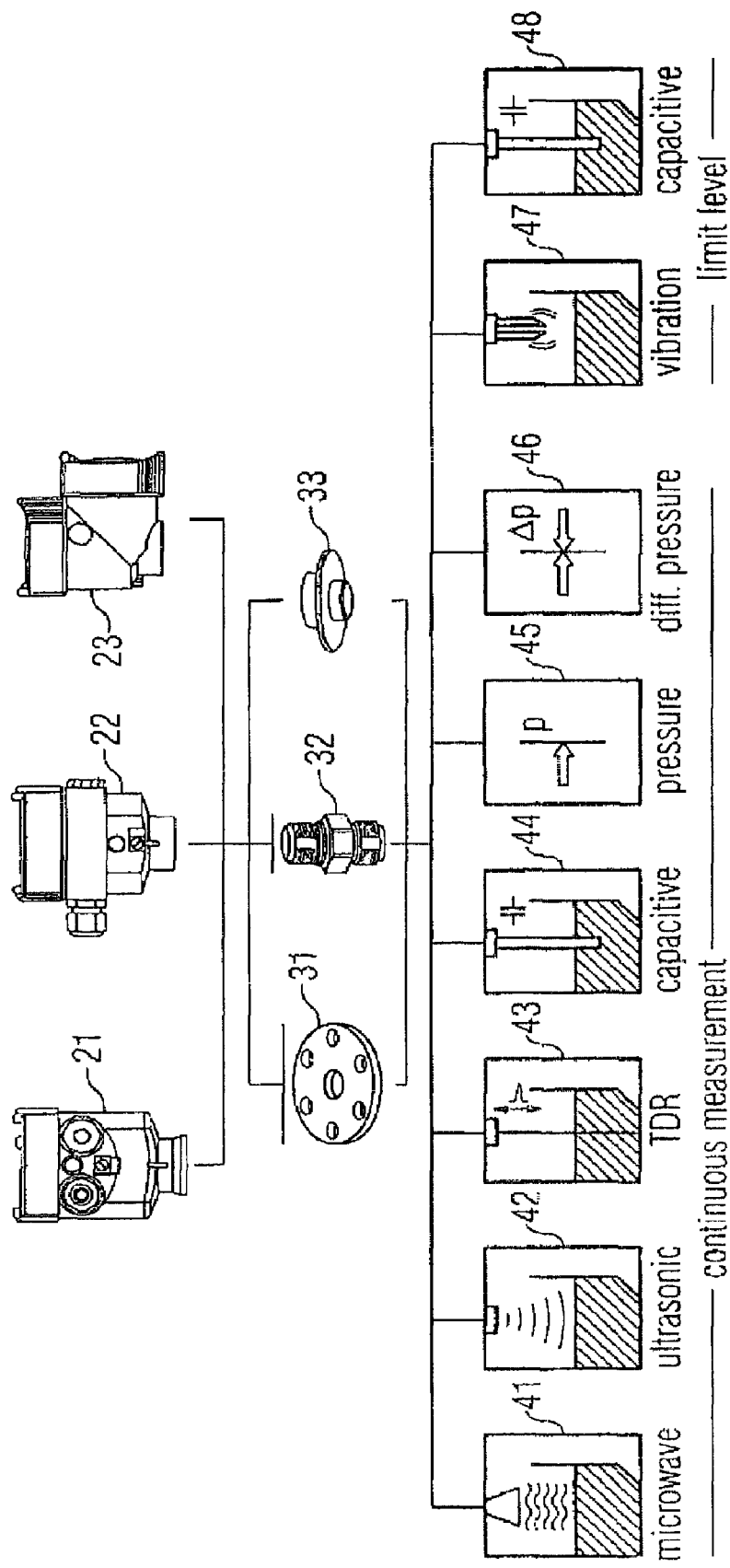
FIG. 2 shows an exemplary basic range of individual mechanical components or units of a system according to the present invention.
Figure 3:
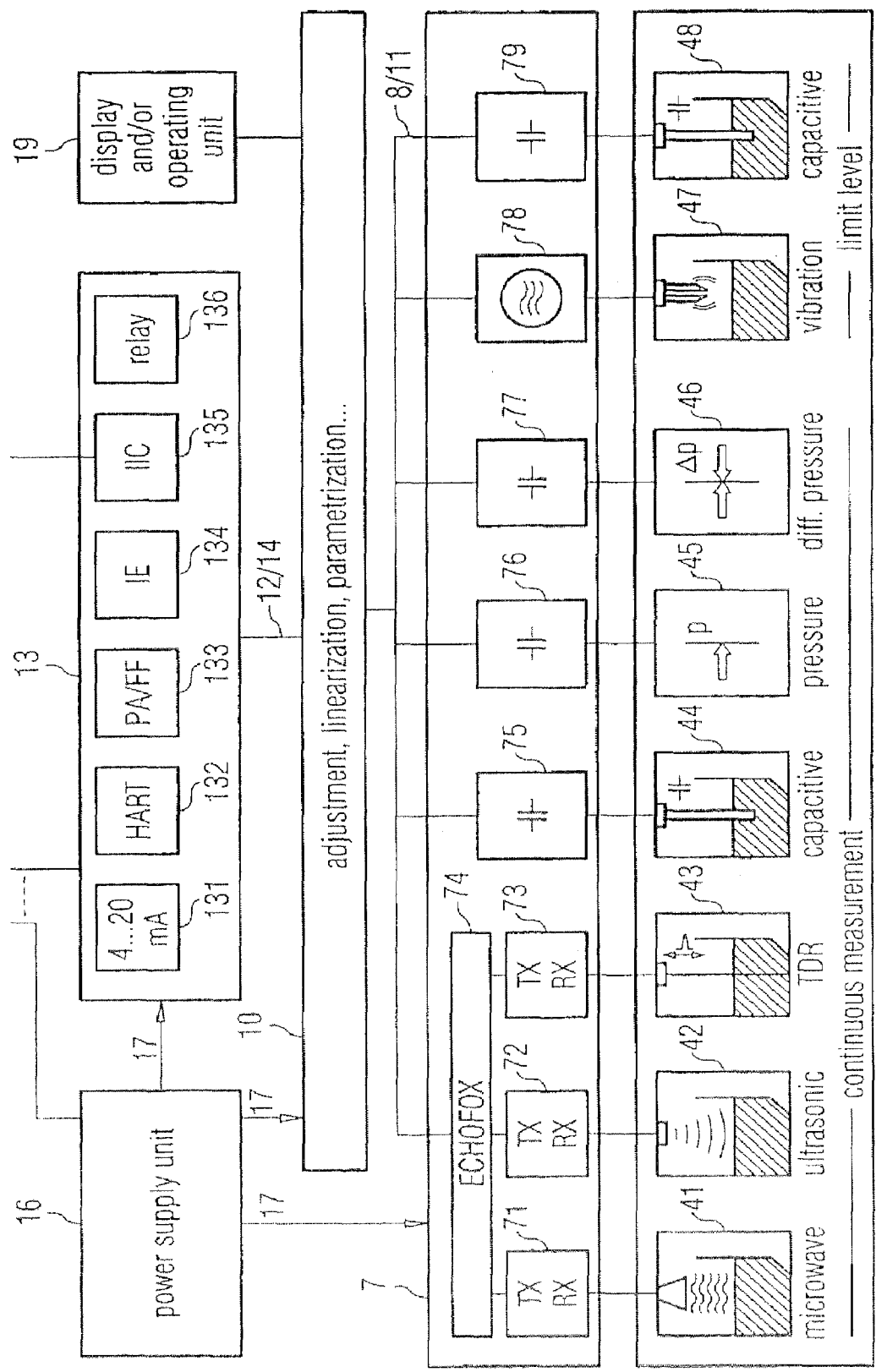
FIG. 3 shows several electrical functional units of an exemplary system according to the present invention.

For illustrating the implementation of the modular structure of the sensor platform according to the invention, FIGS. 2 and 3 show the individual functional units. FIG. 2 essentially shows the mechanical components of the modular structure of a sensor platform according to the invention. As described above, the sensors for filling level measurement are categorized into continuously measuring sensors, indicating, for example, a percentage of the filling level of a vessel, and limit level sensors, only communicating the vessel status when it exceeds, or falls short of, a predetermined level. Depending on the application, different physical measuring techniques are used. This results in the sensor elements 41 to 48 shown in FIG. 2:

sensor element 41 microwave filling level measurement using free radiation (e.g. antenna)

sensor element 42 for ultrasonic radiation filling level measurement (e.g. electro-acoustical sound transducer)

sensor element 43 for filling level measurement using guided electromagnetic waves (e.g. cable probe)

sensor element 44 for capacitive filling level measurement (e.g. rod probe)

sensor element 45 for filling level measurement using hydrostatic pressure (e.g. membrane with dip capacitor or capacitive pressure measuring cell)

sensor element 46 for filling level measurement using a differential pressure (e.g. differential pressure measuring cell)

sensor element 47 for limit level measurement using vibration elements (e.g. tuning fork)

sensor element 48 for capacitive limit level measurement (e.g. rod probe)

The sensor elements listed as 41 to 46 are suitable for continuous measurement of filling levels, whereas the sensor elements 47 and 48 are mainly used for limit level measurement.

In order to ensure the modular structure of the sensor platform also with respect to the sensor elements 41 to 48, these are designed such that, together with the different process connections 31 to 33, they may be attached on different housings 21 to 23.

The process connection 31 is a flange provided with bores, on which one of the housings 21 to 23 and one of the sensor elements 41 to 48 are attached in a conventional manner. The flange is for attaching the sensor 1 on a suitable counterflange of a vessel opening. Alternatively, the process connection 32 is characterized by a screw-in thread while the process connection 33 shows a special approach for a partial field of filling level measurement; process connections 33 of this sort are used in the food industry, for example, where stringent requirements with respect to aseptic conditions are met by process connections that provide such durable sealing.

The housing 21 is an extremely cheap plastics housing, whereas the housings 22 and 23 are of aluminium. The housing 23 is distinguished from the housing 22 in that it has two separate cavities, of which one serves as a connection space for the electrical connecting cables and which possibly contains a separating barrier, while the other one contains the entire electronics of the sensor 1. The underlying idea for such a structure is a certain explosion protection policy (Ex zone protection).

The mechanical components shown in FIG. 2 and necessary for the modular structure of a sensor platform of the present invention can be combined and exchanged at will according to the present invention. In order to ensure such a modular structure, the mechanical components are mechanically designed at their respective interfaces so that each of the housings 21 to 23 may be combined with each of the flanges 31 to 33 and with each of the sensor elements 41 to 48.

Unlike FIG. 2, FIG. 3 shows mainly the electrical functional units which may be combined with each other according to certain rules. In analogy to FIG. 2, the different sensor elements 41 to 48 are shown. Each of the sensor elements 41 to 48 has a corresponding sensor electronics unit 71 to 79 associated with it. The closely related sensor elements 41 to 43 using the delay method each require transmitting and receiving circuits 71 to 73 complemented by an echo processing unit 74, where the transmitting and receiving circuits 71 to 73 are similar to each other because the signals to be received are closely related. Due to the close relationship between the received echo signals, in this present case the echo processing unit 74 may be identically designed; such echo processing units 74 have been developed by VEGA Grieshaber KG, for example, and are sold under the trademark ECHOFOX®. The circuit and signal processing concepts of the present delay filling level measurement sensors are sufficiently well known to those skilled in the art, so that they are not further discussed here, and a reference is cited entitled "Radar level Measurement", by Peter Devine, 2000, ISBN 0-9538920-0-X. The result of the signal processing 74 is a measured value, for example, for the distance between the sensor 1 and the filling matter surface.

The capacitive sensor element 44 for continuous filling level measurement as well as the sensor element 48 for limit level measurement are closely related, the two can therefore be combined with identical or at least partially identical sensor electronics units 75 and 79. This results in further standardization and reduction of the hardware components for a sensor platform.

The same basically applies to the sensor elements 45 and 46 for pressure and differential pressure measurement, respectively, with the associated sensor electronics units 76 and 77, both of which determine a capacitance, e.g., of a dip capacitor or a capacitive pressure measuring cell, respectively. Consequently, the sensor electronics units 75, 76, 77 and 79 could be designed identically or at least partially so.

For vibration limit level measurement, the sensor element 47 (e.g. a tuning fork) is excited by a sensor electronics unit 78 to vibrate, and is evaluated with respect to the amplitude, the frequency and/or phase position of the vibrations carried out.

Thus all sensor electronics units 74 to 79 according to the present invention provide a standardized electrical measured value 8 which correlates in a well known manner with the vessel filling level to be determined. As described above, for the purpose of this signal standardization, the sensor electronics units 71-79 have, for example, a microprocessor with its associated periphery (RAM, ROM, EEPROM, analog-to-digital converter), amplifier, filters and further peripheral units.

Since the electrical measuring quantity 8 is standardized, according to the present invention, for all sensor electronics units 74 to 79, said measured value 8 may be converted into an output value 12 by an evaluation unit 10 identical for all sensor electronics units 74 to 79, where the output value corresponds exactly to the desired filling level information.

For example, for the limit level sensors, this information is "limit level reached"; with continuously measuring sensors, said information is, for example, the degree of the vessel filling in the form of a percentage value.

For converting the measured value 8 into the output value 12, the evaluation unit 10 relies on stored sensor-specific information about the interdependency of the measured value 8 and the physical quantity of interest. This stored information is comprised, for example, of calibration and adjustment values determined during a calibration process at the end of sensor manufacture and during an adjustment process when the sensor is first operated at its location of use. For a microwave filling level sensor the calibration values are, for example, the zero distance point and the relationship of the measured value 8 with respect to the distance of the sensor, i.e. a slope value. The adjustment values include the information on the vessel and the structural position of the sensor 1, allowing the relationship of the values of the distance between the sensor and the filling matter to the vessel filling level to be established. If because of the vessel geometry this relationship is not linear, a vessel-specific linearization is also needed.

The necessary calibration and adjustment values are fed to the sensor 1 from the outside via the input and output unit 13 and communicated to the avaluation unit 10 via the information channel 14. Moreover, if needed, further information for parametrizing the sensor I will also pass in this manner to the evaluation unit 10, so that the sensor 1 may be optimally adapted to its tasks. Conversely, if needed, the evaluation unit 10 can provide not only the information about the necessary output value 12 but also additional existing information, such as autodiagnostic values of the sensor 1.

Such sophisticated sensors may also need an exchange of parameters between the evaluation unit 10 and the sensor electronics unit 7 via the information paths 8 or 11, respectively.

The output unit 13 comprises a number of components, 131 to 136, which as mentioned above enable the information exchange of the sensor 1 with the exterior world, such as with a process control 15. The integration of the sensor 1 in the process control system 15 is achieved using the usual field bus systems, such as Profibus PA, Fieldbus Foundation, Industrial Ethernet or HART. The respective components 132, 133 and 134 are implemented in hardware and software in the output unit 13.

A further common connection to a process control system 15 is the analog 4-20 mA current output 131. With so-called loop-powered sensors, the simultaneous utilization of a wire pair for the supply of electrical energy and for the transmission of information is the usual practice in order to reduce wiring overhead.

If needed, the sensor 1 can also include an additional interface, such as in the form of a serial IIC bus interface 135, in addition to the integration in the process control system 15, allowing the sensor 1 on site to communicate with a connected computer. An optional display and operating unit 19 which may be situated within the sensor or also separate from it, also communicates with the evaluation unit 10.

The power supply unit 16 is supplied with electrical energy either via dedicated power lines or the lines shared for information transmission and provides the controlled voltages 17, preferably 3V and 5V, for the individual hardware components.

The purely functional units of the sensor platform have been described so far. In the practical implementation, the present functional platform concept for filling level sensors results in the following hardware components:

A standardized power supply unit with a combination of a voltage supply unit and parts of the output unit in alternative embodiments, a partially standardized digital portion having circuit portions of the sensor electronics unit and the microprocessor including the associated periphery for carrying out individual functions of an evaluation unit, output unit and sensor electronics unit, an optional standard display and operating unit as well as hardware components with a sensor electronics unit, some of which are standardized, some individually designed. These components form the electronic hardware basis of the "sensor platform". The microprocessor may be flexibly equipped with both standardized and individually designed software modules. Examples for this are one software module for communication, one for measured value evaluation and one adapted for sensor signal processing.

Figure 4:
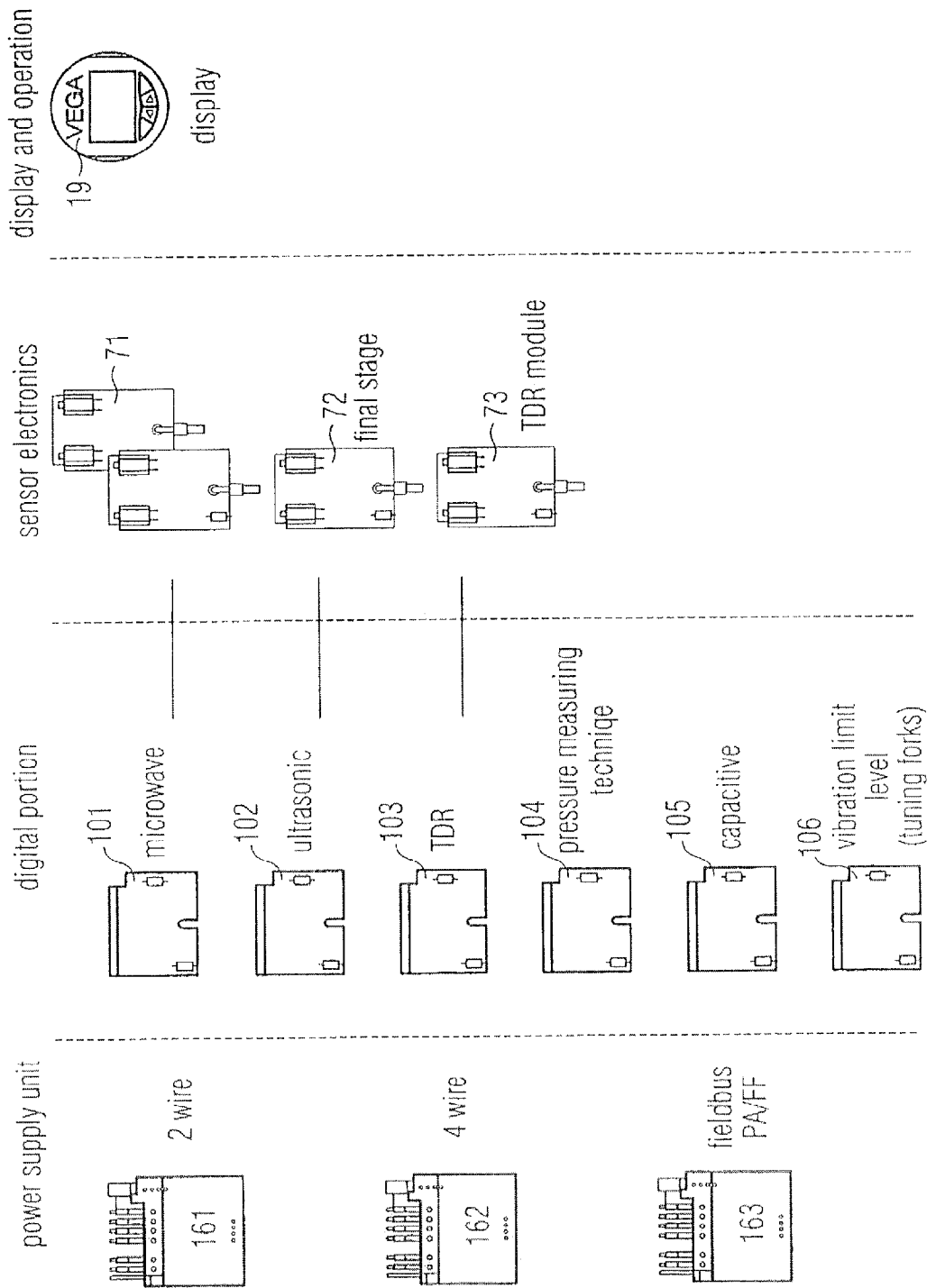
FIG. 4 shows several individual hardware components of an exemplary system according to the present invention.

FIG. 4 shows the modular components of the electronic hardware components necessary for the modular structure of the sensor platform. The entire electronics consists of a minimum of two (power supply and digital portion), and a maximum of four assembled printed circuit boards configured according to the invention in such a way that they can be sensibly combined according to certain criteria. For this purpose, the components fulfilling the same functions each have the same mechanical dimensions.

As regards the power supply unit, three different embodiments 161-163 with uniform mechanical dimensions are available: a two-wire power supply unit 161 connectable with a 4-20 mA two-wire process control loop, if needed with additional HART communication, a four-wire power supply unit 162 having a conductor pair for voltage supply and a conductor pair for measured value output and a field bus power supply unit 163 connectable to a Profibus PA, Fieldbus Foundation or Industrial Ethernet. The different digital portions 101-106 are distinguished with respect to each measuring technique used. While the more sophisticated measuring techniques 101-103 (microwaves, ultrasonic waves, or TDR) each need a printed circuit board with an additional sensor electronics unit 71-73, the simpler measuring techniques using pressure, capacitance or vibration, have the sensor electronics unit arranged on the same digital printed circuit board 104-106 as the microprocessor functional unit.

Optionally, a separately housed display and operating unit 19 is added to each electronics assembly of the sensor 1 and completes it.

The modular structure according to the invention of a sensor platform based on the modular elements previously described will be explained below in detail with reference to two concrete modularly structured sensors.

Figure 5:
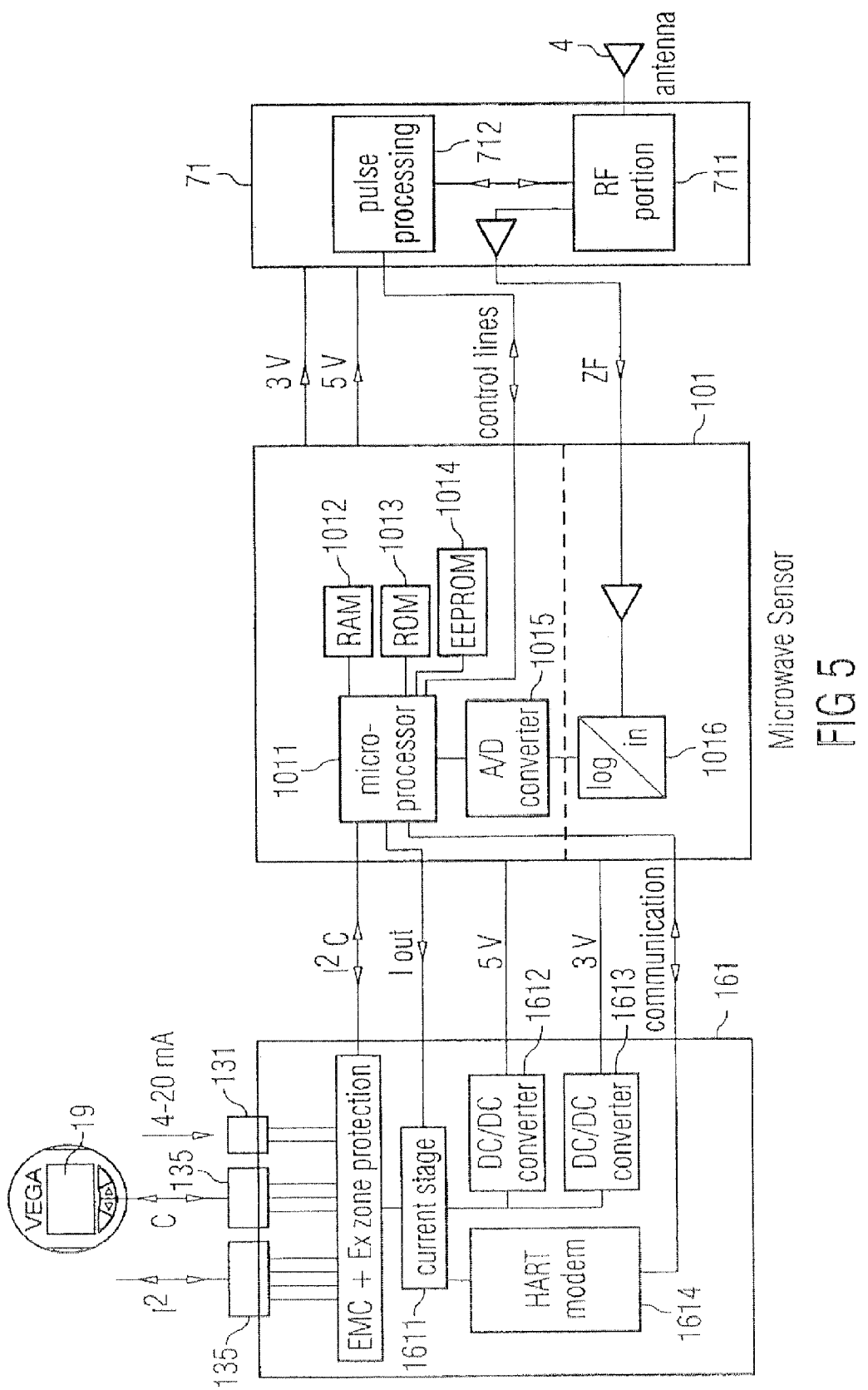
FIG. 5 shows a functional circuit diagram of an exemplary embodiment of an apparatus according to the invention.
Figure 6:
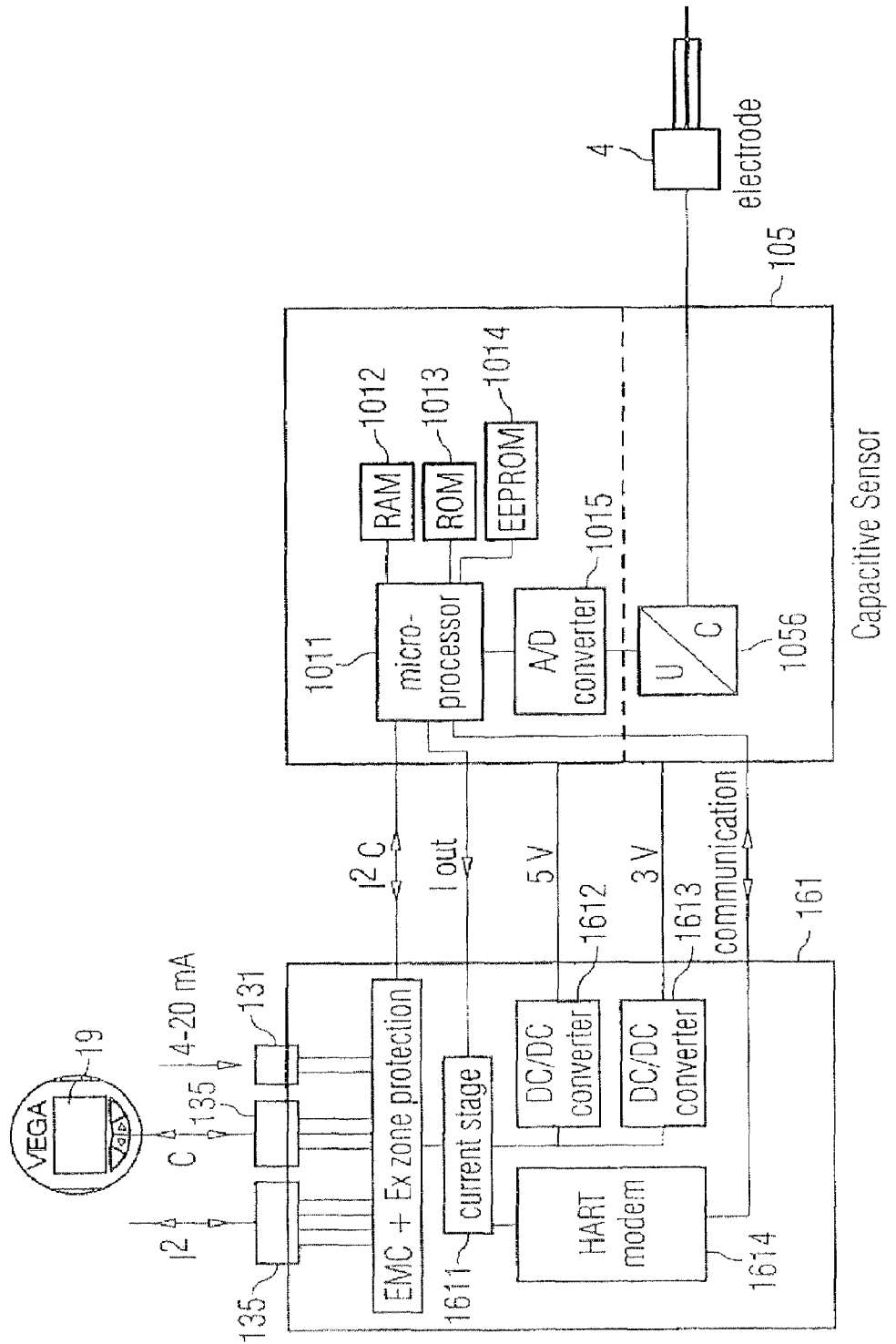
FIG. 6 shows a functional circuit diagram of a further exemplary embodiment of an apparatus according to the invention.

In FIGS. 5 and 6, the functional blocks of the individual printed circuit boards and their interconnections are shown for a two-wire microwave sensor (FIG. 5) and a capacitive two-wire sensor (FIG. 6).

The two-wire power supply unit 161 identical for both sensors provides connectability for the 4-20 mA two-wire current loop 131 that the sensor—as is well known—uses not only to output the measured value but also to be supplied with energy. The power supply unit 161 includes two IIC bus interfaces 135 for connection to an optional internal and/or external display and operating unit 19 or a computer.

All inputs and outputs of the power supply unit are protected by suitable measures with respect to electromagnetic compatibility (EMC) and explosion protection. The power supply unit 161 includes a current loop 1611 which receives information about the measured value from the digital printed circuit board and suitably controls the current flowing on the two-wire loop between 4 and 20 mA.

The input voltage applied at the 4-20 mA two-wire current loop is converted by two DC/DC converters 1612, 1613 into stabilized voltages of 3V and 5V and supplied to the digital portion. Digital information is modulated via the HART modem 1614 onto the two-wire current and information is demodulated from said two-wire current. This information is exchanged between the HART modem and the microprocessor via these communication lines.

The digital portion 101 or 105 for both sensors includes identical microprocessors 1011 with associated periphery (RAM 1012, ROM 1013, EEPROM 1014, A/D converter 1015) and a differing portion comprising components of the sensor electronics unit. For the two-wire microwave sensor, an additional printed circuit board 71 including further parts of the sensor electronics unit is necessary because of the greater circuit overhead. The RF module 711 included therewith generates a trans mission signal radiated via the sensor element 4 towards the filling matter surface. The wave reflected from it is received again by the sensor element 4 and transformed in the receiver of the RF module 711 into, for example, a different frequency or time plane. The clock pulses for the transmitting and receiving unit are generated by the pulse processor 712 in the sensor electronics unit 71, in turn connected with the microprocessor 1011 via control lines. Via these control lines, the parameters of the RF module 711 such as activate/deactivate of the sensor electronics unit 71 or the difference between the transmitting and the receiving clock are adjustable.

The so-called intermediary frequency coming from the receiving unit is forwarded, after amplification, to the A/D converter 1015 via a logarithmic amplifier 1016 which additionally demodulates the intermediary frequency as a logarithmic envelope representing the intensity of the reflections over time. After the analog-to-digital conversion of the discrete envelope values, the latter are latched in the RAM by the microprocessor 1011 and evaluated with respect to the location of the reflection from the filling matter surface. With the aid of the adjustment and calibration values stored in the EEPROM, the microprocessor 1011 can associate a degree of vessel filling with a determined distance to the filling matter surface. From this, eventually, the value of the loop current to be adjusted is obtained as mentioned above and forwarded to the current stage 1611 of the power supply unit 161.

In FIG. 6 the capacitive two-wire sensor is shown including exactly the same power supply unit 161 as the two-wire microwave sensor described with reference to FIG. 5. Also, the microprocessor 1011 including the associated periphery (1012-1015) is the same, of course, also resulting in the interface between the power supply unit 161 and the digital portion 101 being identical.

In this capacitive sensor, the sensor specific circuit portion can be accommodated in its entirety on the digital portion 105 so that an additional printed circuit board including the sensor electronics unit can be eliminated. The capacitance of the sensor element 4 (electrode) is converted into a voltage signal by the capacitance-voltage converter 1056, the voltage signal being accessible to the microprocessor via the A/D converter 1015. In analogy to the microwave sensor, the voltage value representing the momentary capacitance is compared with the calibration and adjustment values stored in the EEPROM 1014 allowing the filling degree of the vessel to be derived.

The functional operation of the sensor electronics unit (capacitance-voltage conversion) is known from the prior art and will not be explained here in any more detail.

Figure 7:
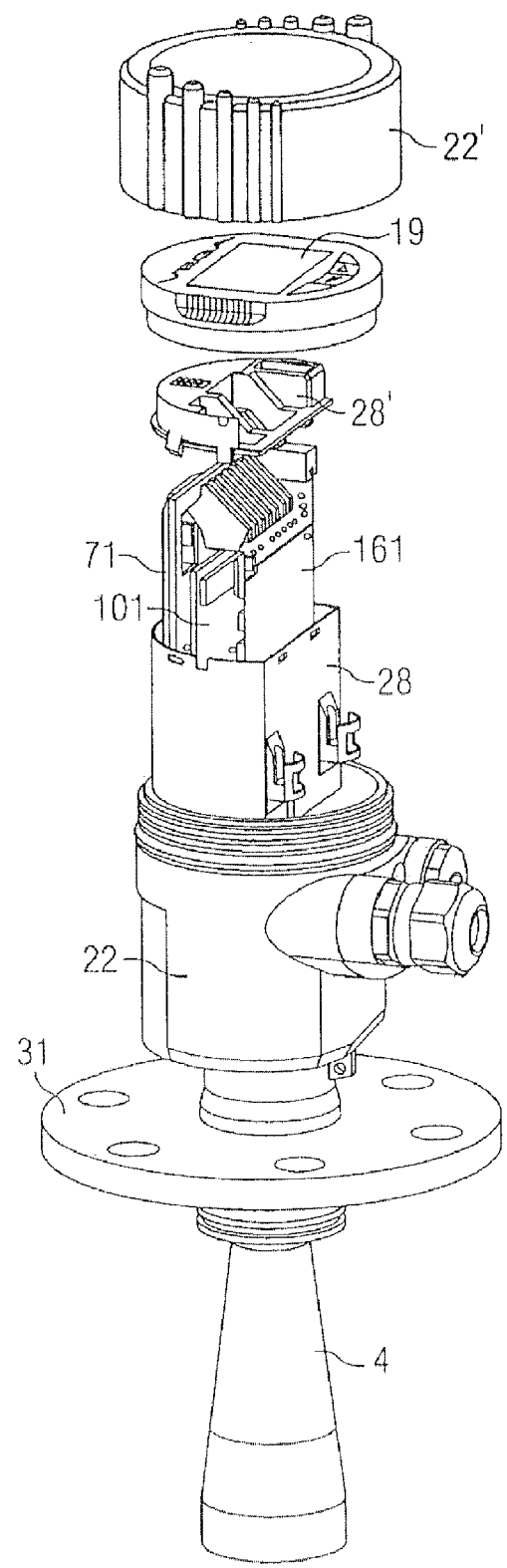
FIG. 7 shows an exploded view of a further exemplary embodiment of an apparatus according to the invention.

FIG. 7 shows the assembly of the microwave sensor of FIG. 5 including the essential components. Sensor specific components are only the sensor element 4 (horn antenna), the printed circuit board including the sensor electronics unit 71 and the digital printed circuit board 101. The process connection 31, the housing 22 including the cover 22', the inner housing 28 including cover 28', the voltage supply unit or the power supply unit 161 and the display and operating module 19 are universally usable for the respective platform so that for the respective capacitive two-wire sensor according to FIG. 6 exactly the same components may be used.

Figure 8:
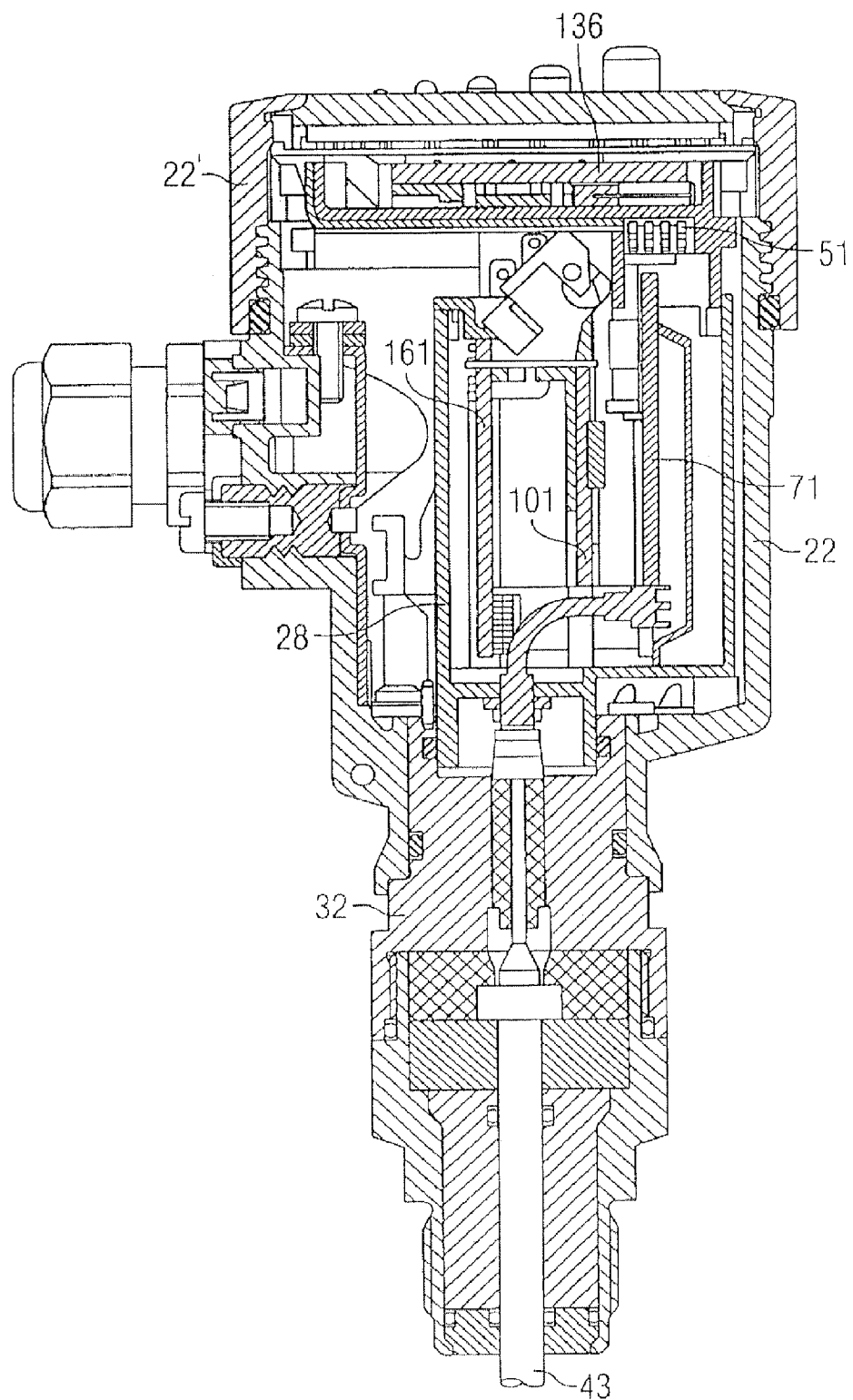
FIG. 8 shows a longitudinal sectional view of a further exemplary embodiment of an apparatus according to the invention.

In FIG. 8, the great advantage resulting from the modularity of the system becomes evident. Essentially, FIG. 8 shows a sensor only slightly modified with respect to the microwave sensor of FIG. 7, although the sensor shown in FIG. 8 is a TDR sensor. While according to the prior art considerable changes both in the electronics and in the mechanical components of the sensor were required in order to convert a sensor, in the present case the conversion is essentially limited to the exchange of the sensor unit. Such a simple sensor conversion is possible due to the standardization of the dimensions of the corresponding mechanical and electronic components according to the present invention.

Due to the sectional view, FIG. 8 shows the individual components more clearly. As indicated before, compared with the microwave sensor in FIG. 7, the horn antenna 41 has been replaced by a rod or cable probe 43 for the present TDR sensor. The rod or cable probe is fitted into the process connection 32 and is fed with signals by the sensor electronics printed circuit board 73 and/or supplies the reflected signals to the sensor electronics printed circuit board for further processing. As can be seen, the process connection 32 consists of multiple parts, wherein the individual parts have been sealed with o-rings with respect to each other in order to avoid liquid or gas exchange with the interior of the sensor housing or the environment.

The process connection 32 in turn is fitted in the housing 22 and also sealed in the gap with the housing using an o-ring. The housing 22 has at least one interior space, into which the inner housing 28 has been inserted, accommodating the electrical assemblies such as the digital printed circuit board 101, power supply unit 161 and sensor electronics unit 73. The housing may be closed off at the top using a housing cover 22' and is sealed with respect to the housing 22 using an o-ring. In the present embodiment, a display and operating module is integrated into the housing cover and electrically connected with the sensor electronics unit using sliding contacts 51.

Figure 9:
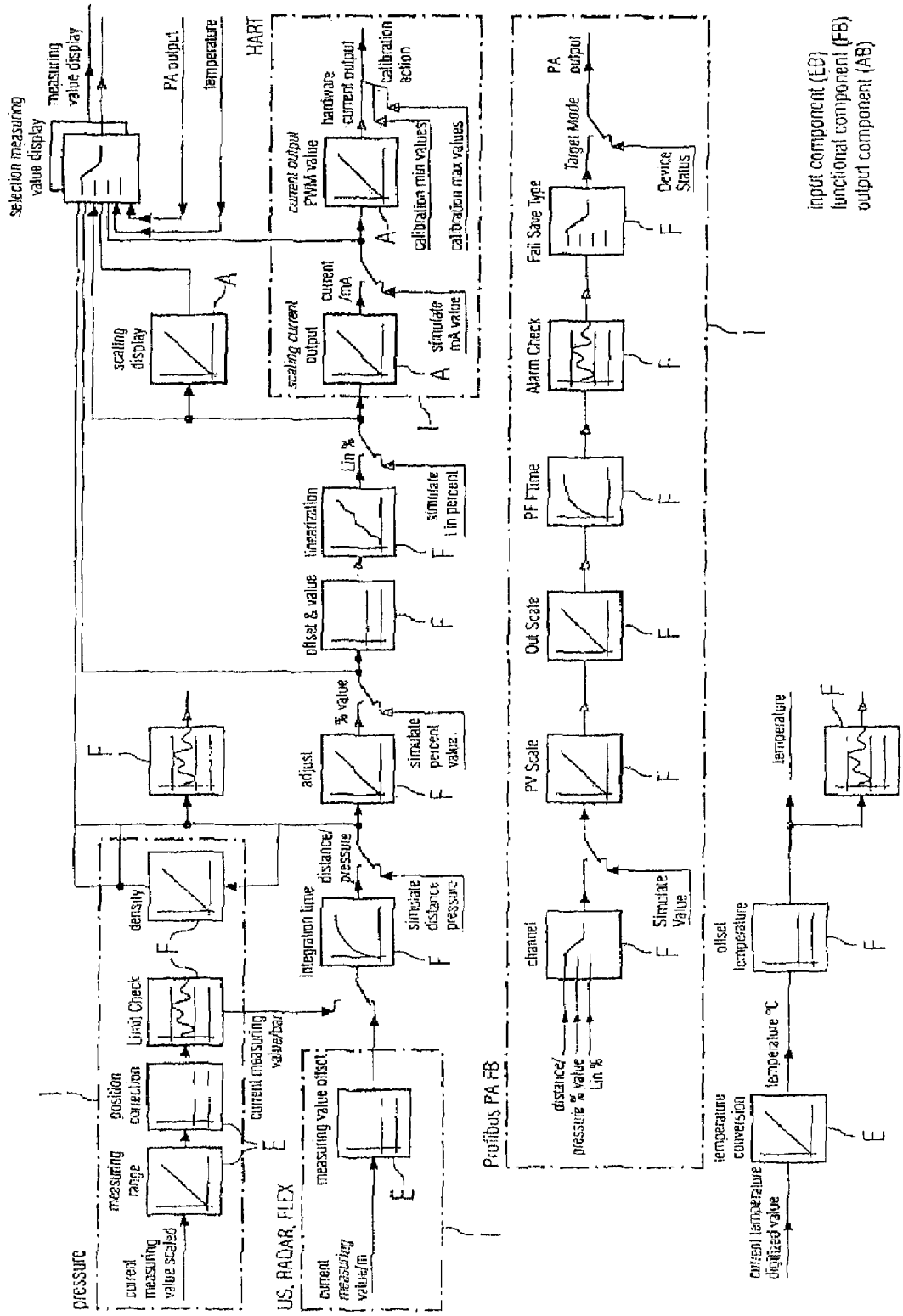
FIG. 9 shows a schematic overview of a measured value processing of an exemplary embodiment of a system according to the invention.

The block circuit diagram in FIG. 9 showing a measured value processing of an exemplary embodiment of a system according to the invention is an overview of the computations that must be performed in order to obtain an output signal corresponding to the physical measuring quantity from which the process quantity to be determined may be derived.

In FIG. 9 input components are designated as "E", functional components as "F" and output components as "A". The distinction of the sensor types between pressure and filling level sensors can only be found in the input area. The portions designated "I" contain the processing modules that are not needed in all variants of the software, such as current output. This is only necessary with HART devices. In a Profibus PA sensor, the function block (FB) with a digital output is substituted.

In the input section of the measured value processing, the measured value of the sensor is associated with physical values having the basic unit meter or bar. After being subjected to an attenuation (integration) a conversion into a percentage value proportional to the measured value is carried out, if needed. The latter may be provided with an offset before it is converted to a volume proportional percentage value with the aid of linearization. This "linearized" value is then optionally output on the display, at the current output, or digitally presented.

With the aid of a position switch, each desired form of measured value may be displayed on the display. Scaling allows a conversion into any desired units (e.g. liters, m³, inch, mbar).

From the linearized percentage value, the current value is computed, the latter is converted into a pulse width modulated (PWM) signal which generates the corresponding current signal on the hardware.

The digital Profibus output optionally samples the measured value from different places in the measured value processing and, when presented with the respective profile, computes the digital value for the cyclical data traffic.

A further measured value to be measured by the sensor is the filling matter or sensor temperature. For this purpose, the respective functional module converts the detection value into a digital measured value scaled to the unit of degrees Celsius.

From the two physical measured values of filling level (or pressure) and temperature, the lowest and highest measured values are recorded ("peak value function"). These can then be retrieved, e.g., for servicing.

When first operating the filling level measuring device, the measured value can be simulated at different places in the processing. For this purpose, the processing chain is interrupted, and at this point the simulation value is fed in.

Figure 10:
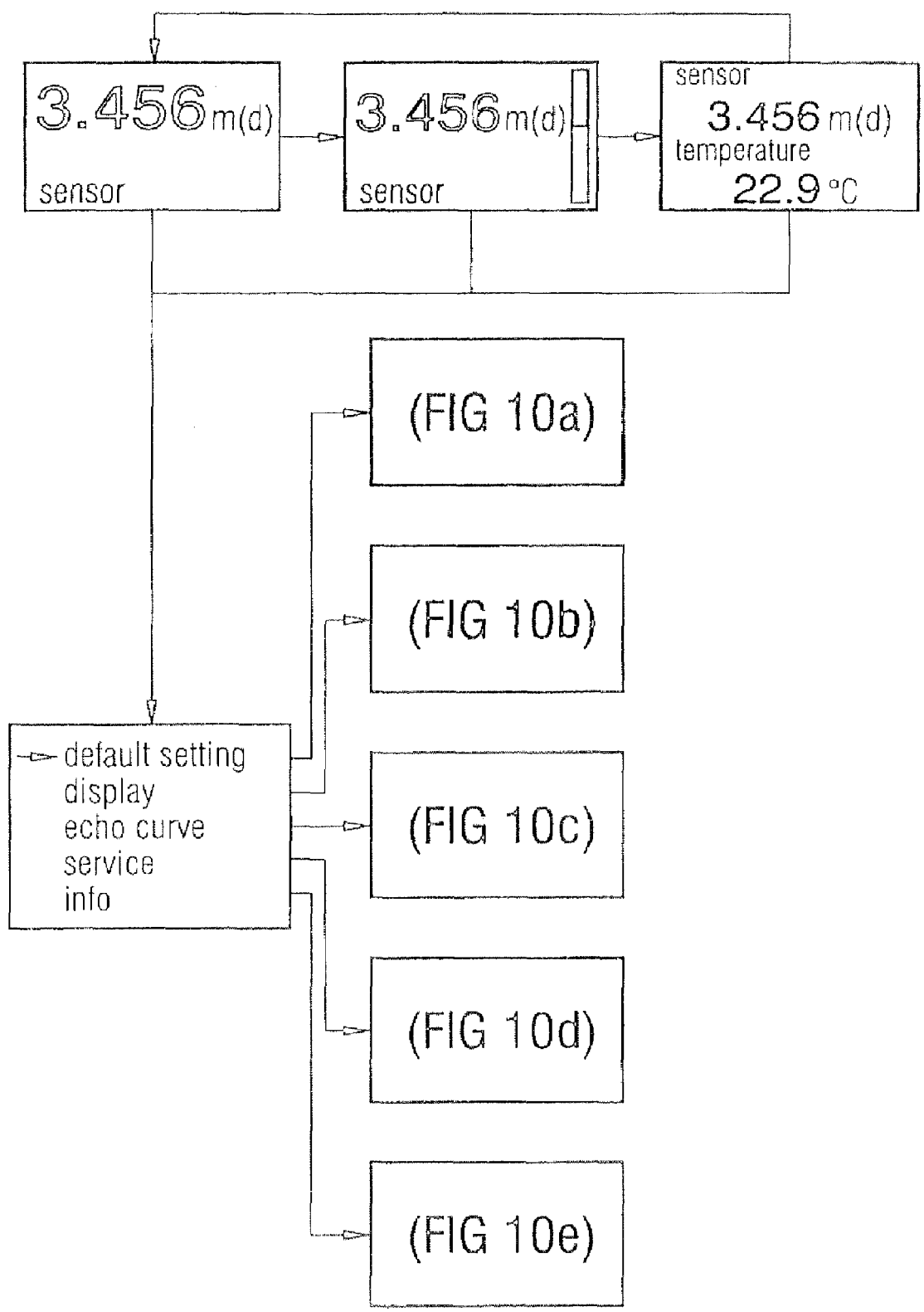
FIG. 10 shows an overview of a menu structure of an exemplary embodiment of an apparatus according to the invention.
Figure 10A:
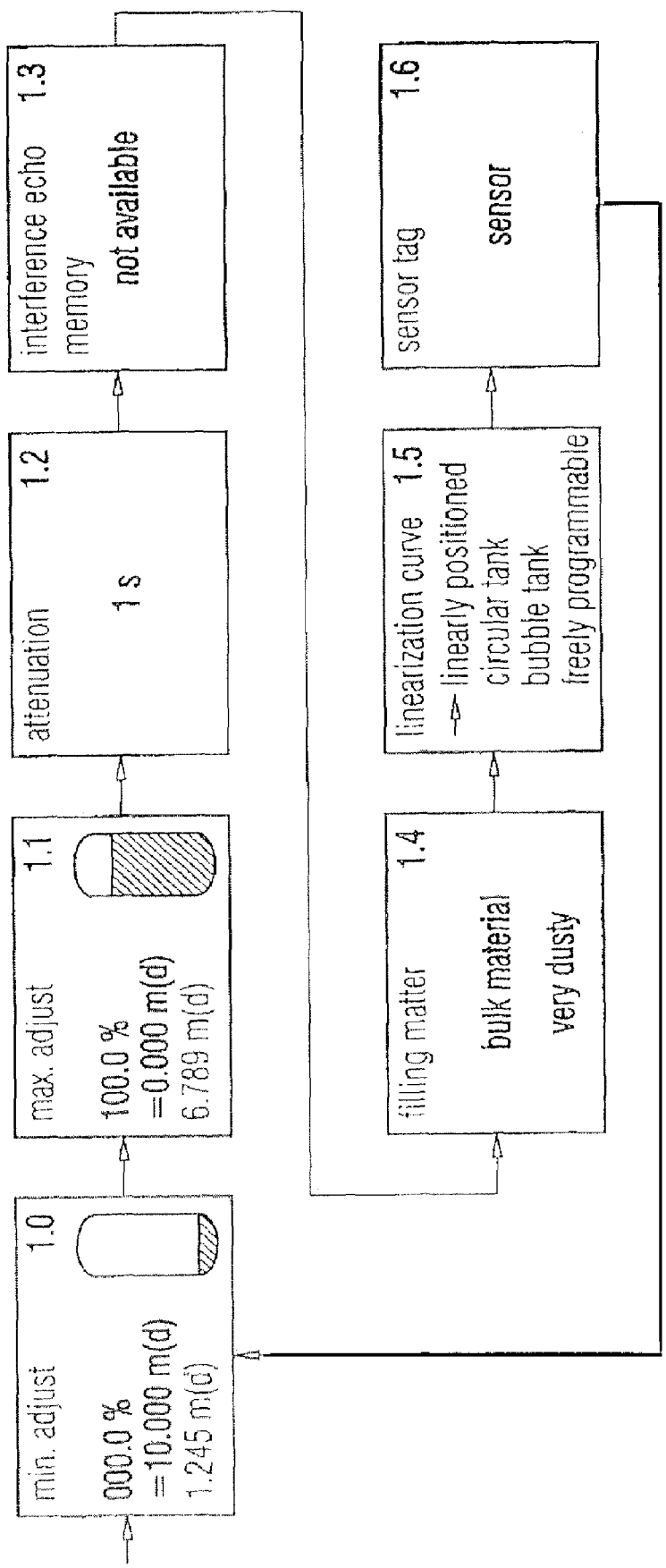
FIG. 10a shows a submenu of the overview shown in FIG. 10.
Figure 10B:
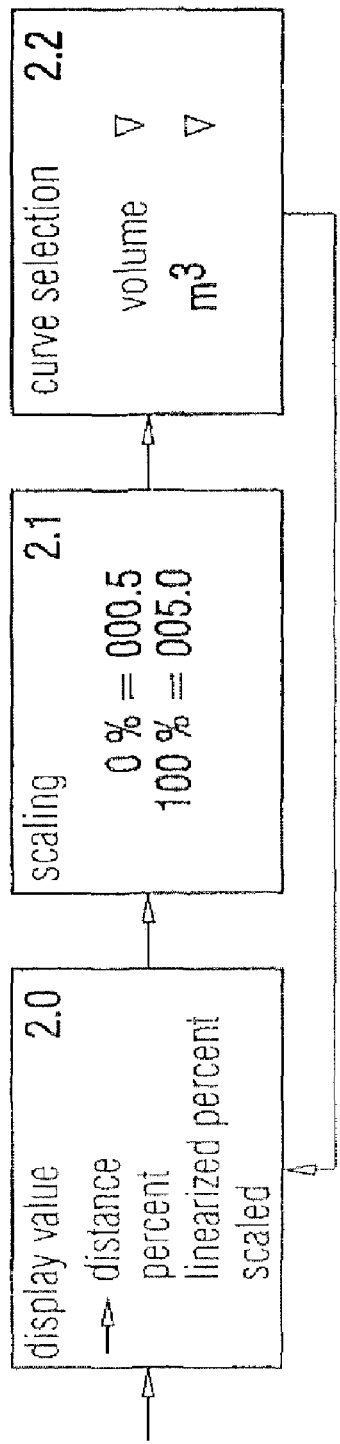
FIG. 10b shows a further submenu of the overview shown in FIG. 10.
Figure 10C:
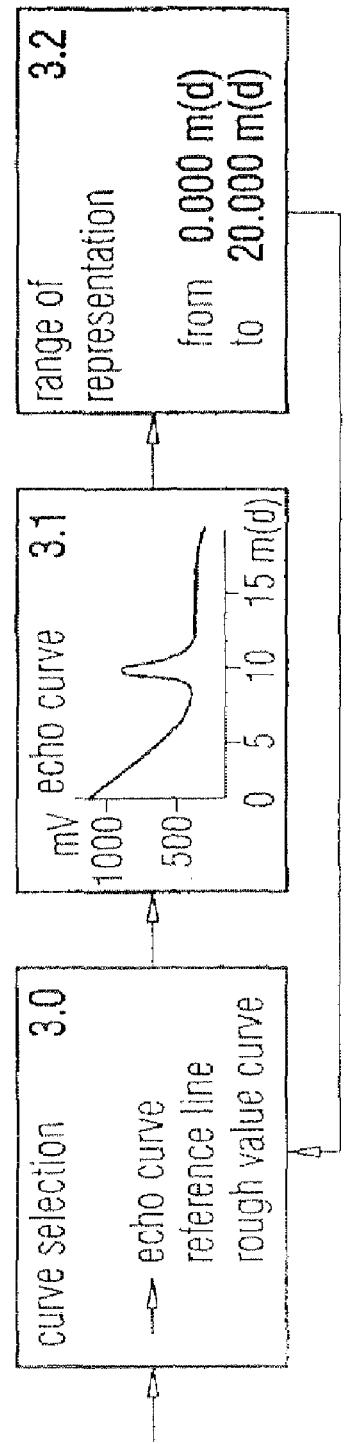
FIG. 10c shows a further submenu of the overview shown in FIG. 10.
Figure 10E:
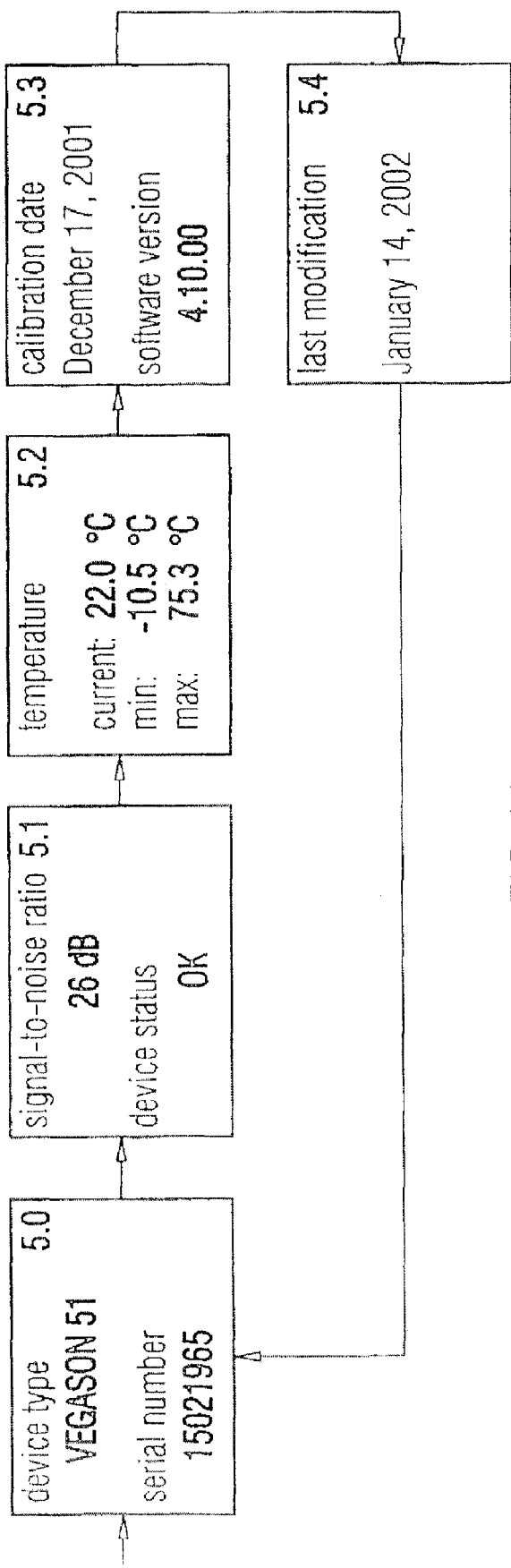
FIG. 10e shows a further submenu of the overview shown in FIG. 10.
Figure 11:
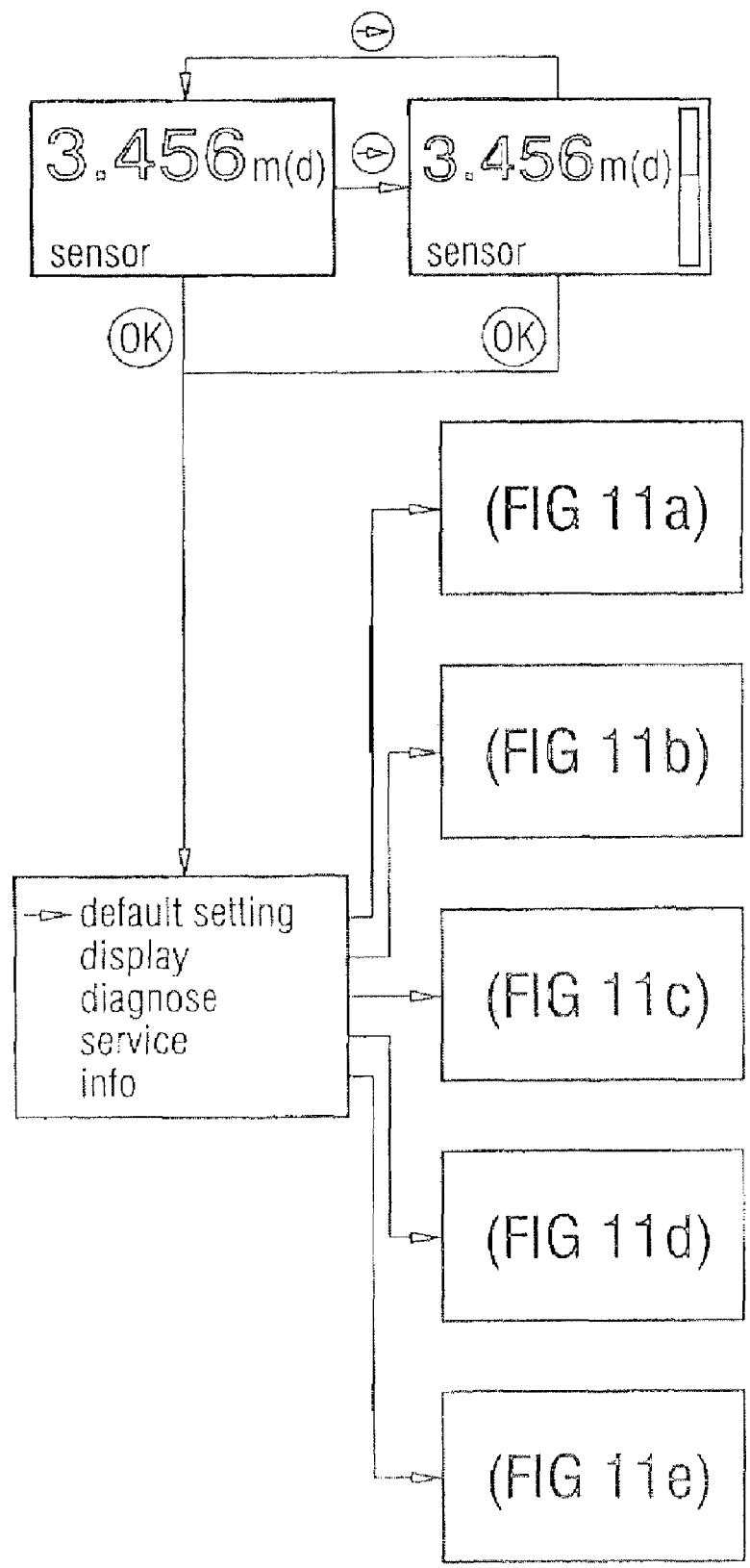
FIG. 11 shows a further overview of a menu structure of an exemplary embodiment of an apparatus according to the invention.
Figure 11B:
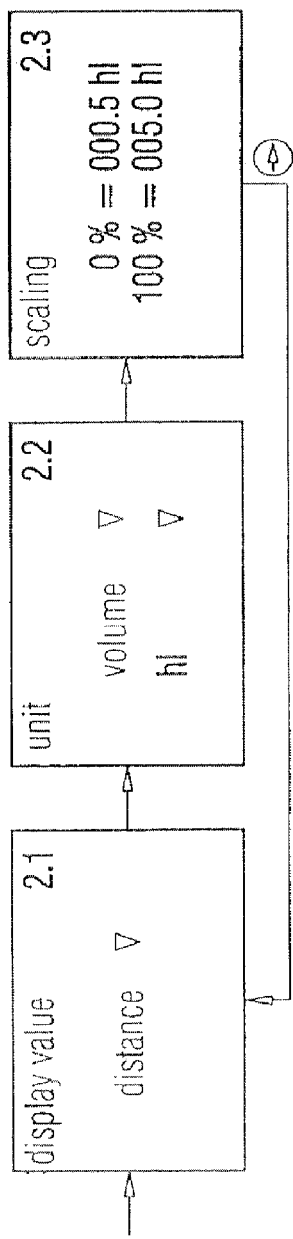
FIG. 11b shows a further submenu of the overview shown in FIG. 11.
Figure 11C:
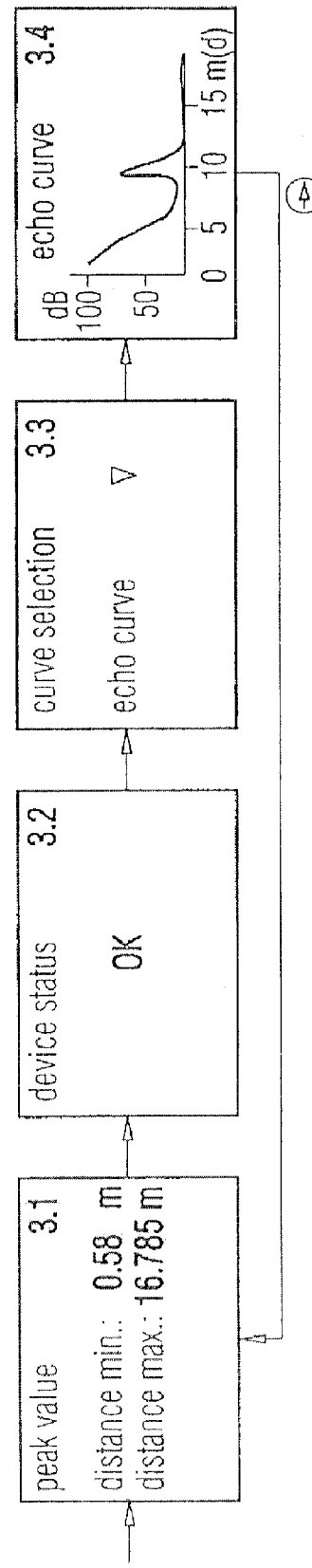
FIG. 11c shows a further submenu of the overview shown in FIG. 11.
Figure 11D:
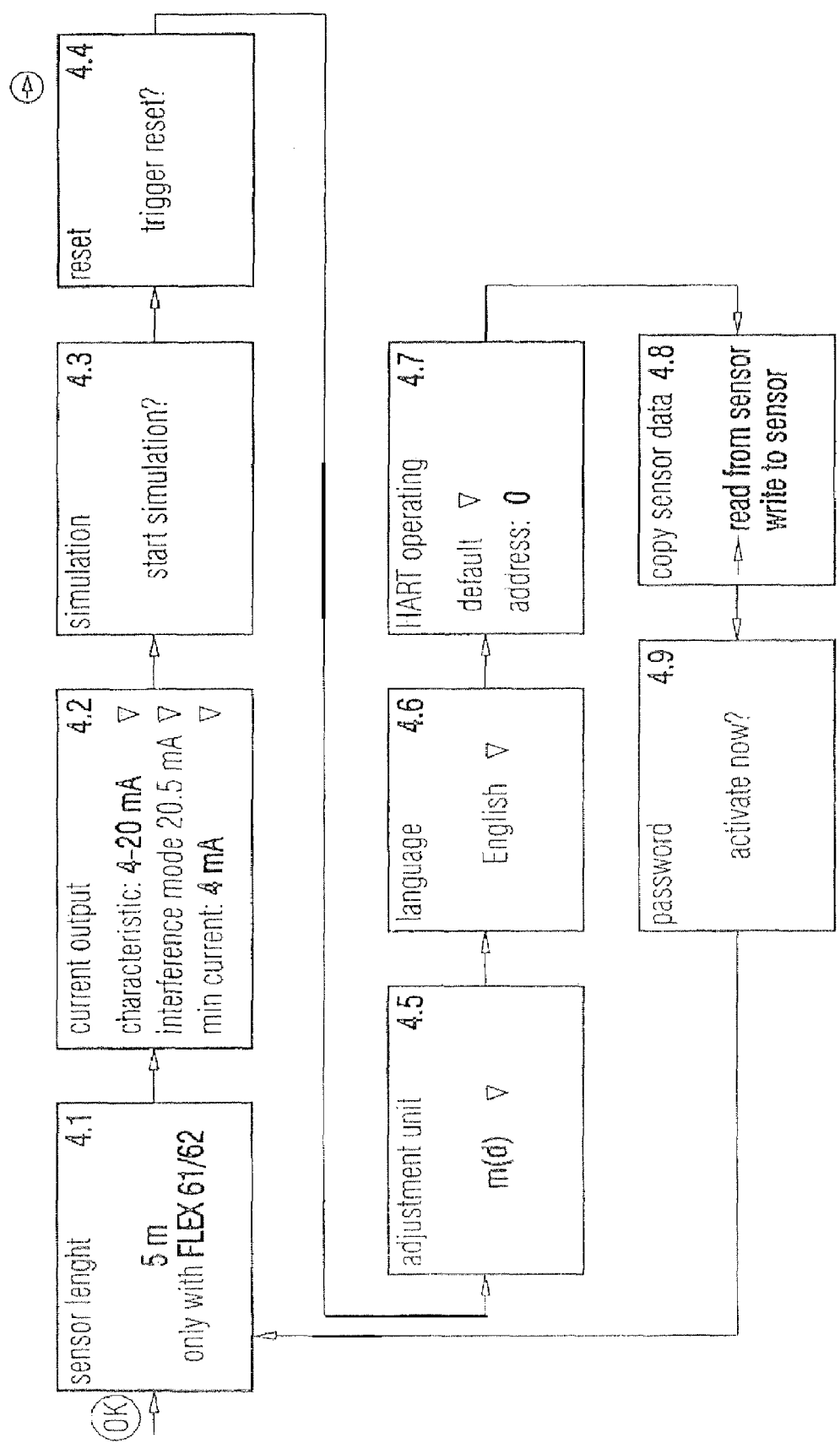
FIG. 11d shows a further submenu of the overview shown in FIG. 11.
Figure 11E:
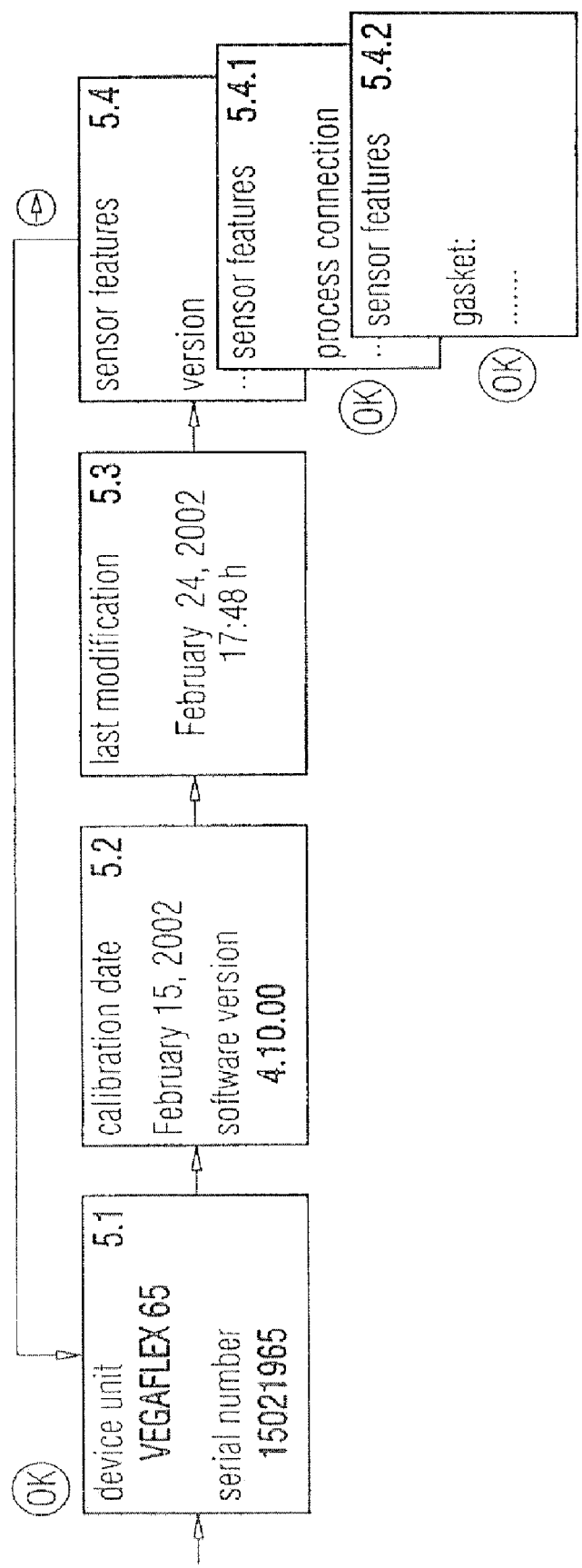
FIG. 11e shows a further submenu of the overview shown in FIG. 11.
Figure 12:
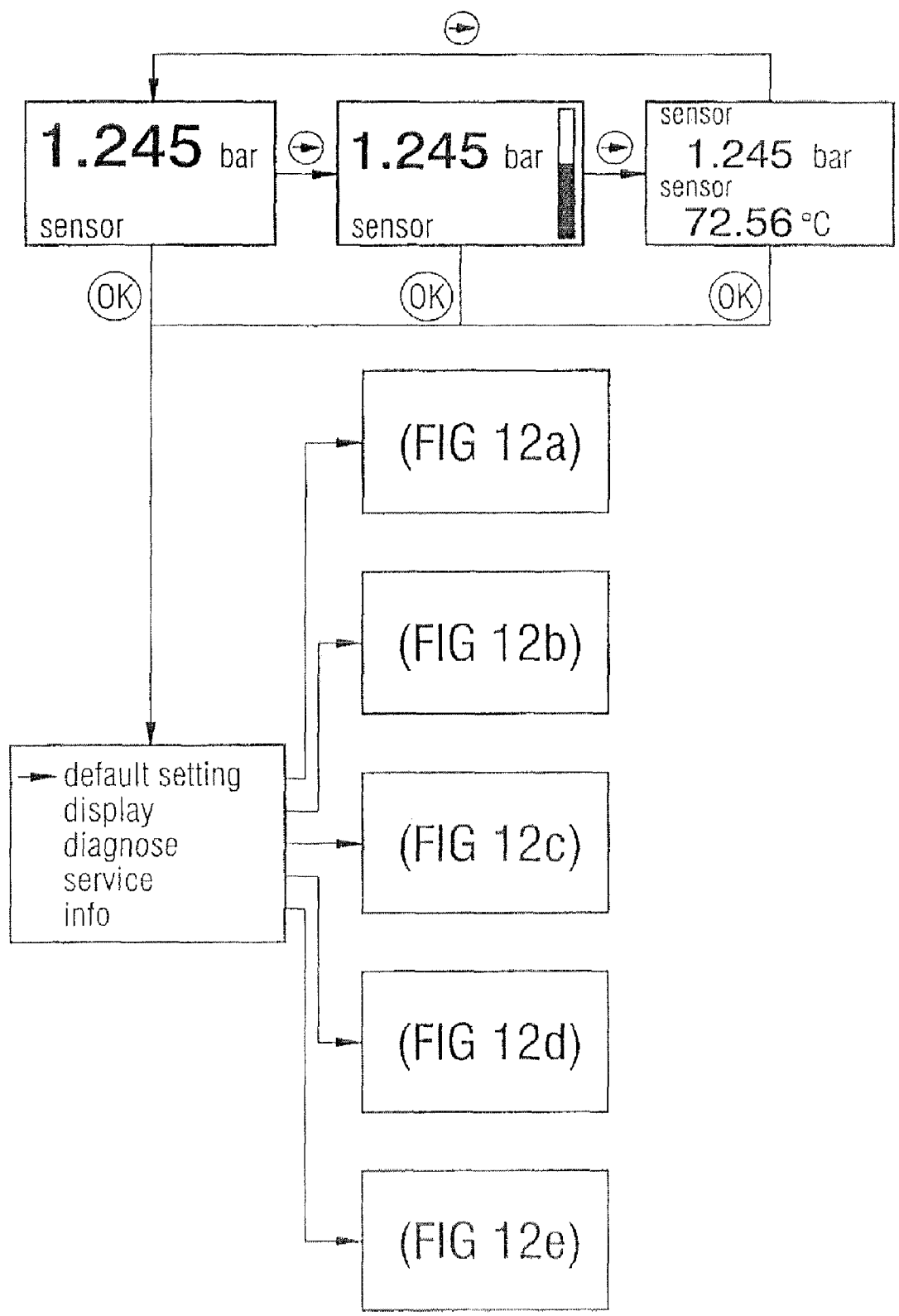
FIG. 12 shows a further overview of a menu structure of an exemplary embodiment of an apparatus according to the invention.
Figure 12A:
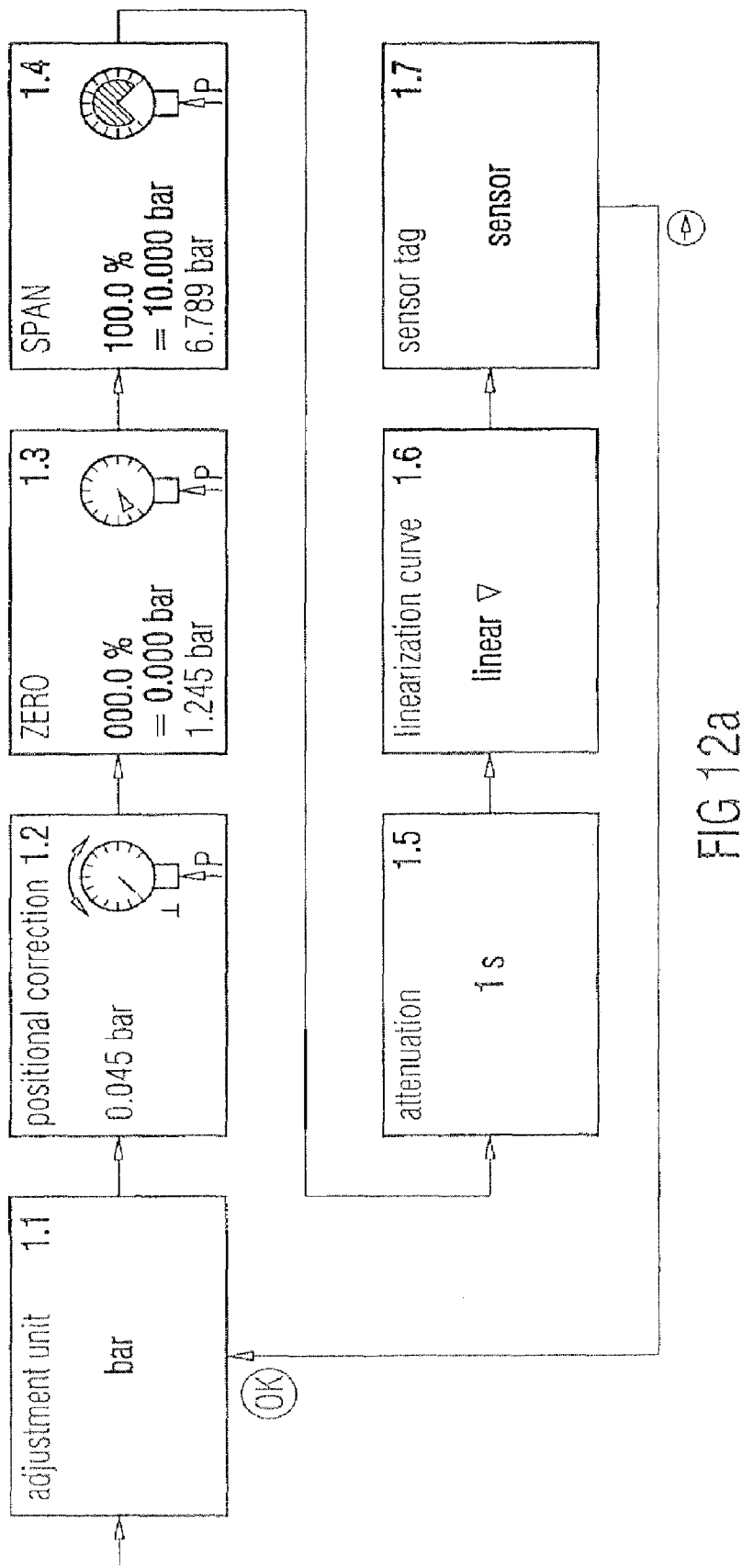
FIG. 12a shows a submenu of the overview shown in FIG. 12.
Figure 12B:
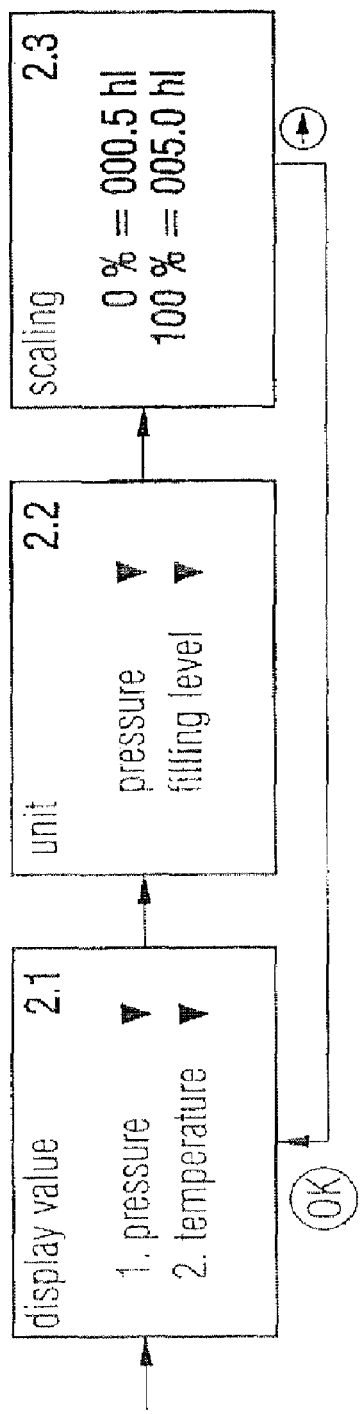
FIG. 12b shows a further submenu of the overview shown in FIG. 12.
Figure 12C:
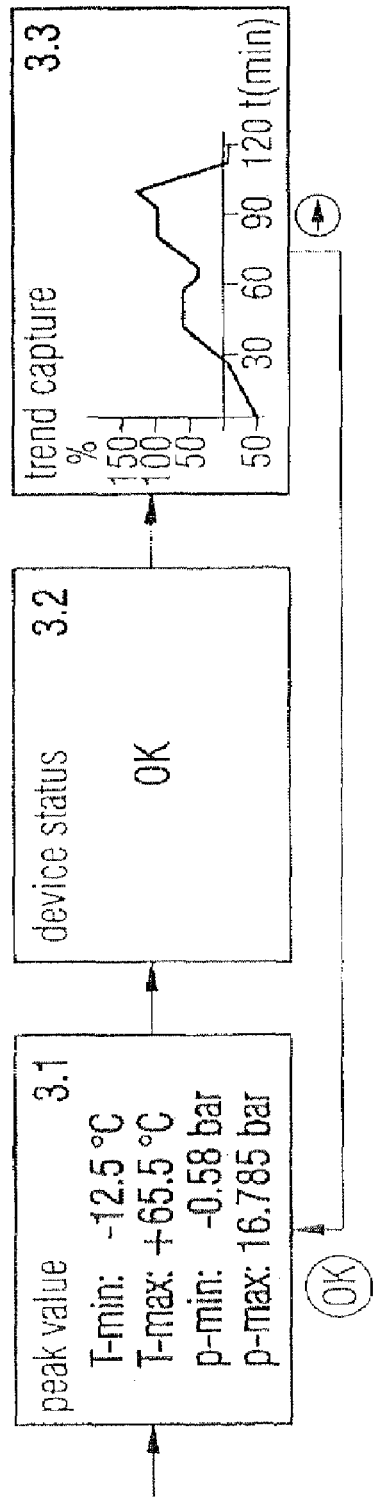
FIG. 12c shows a further submenu of the overview shown in FIG. 12.
Figure 12D:
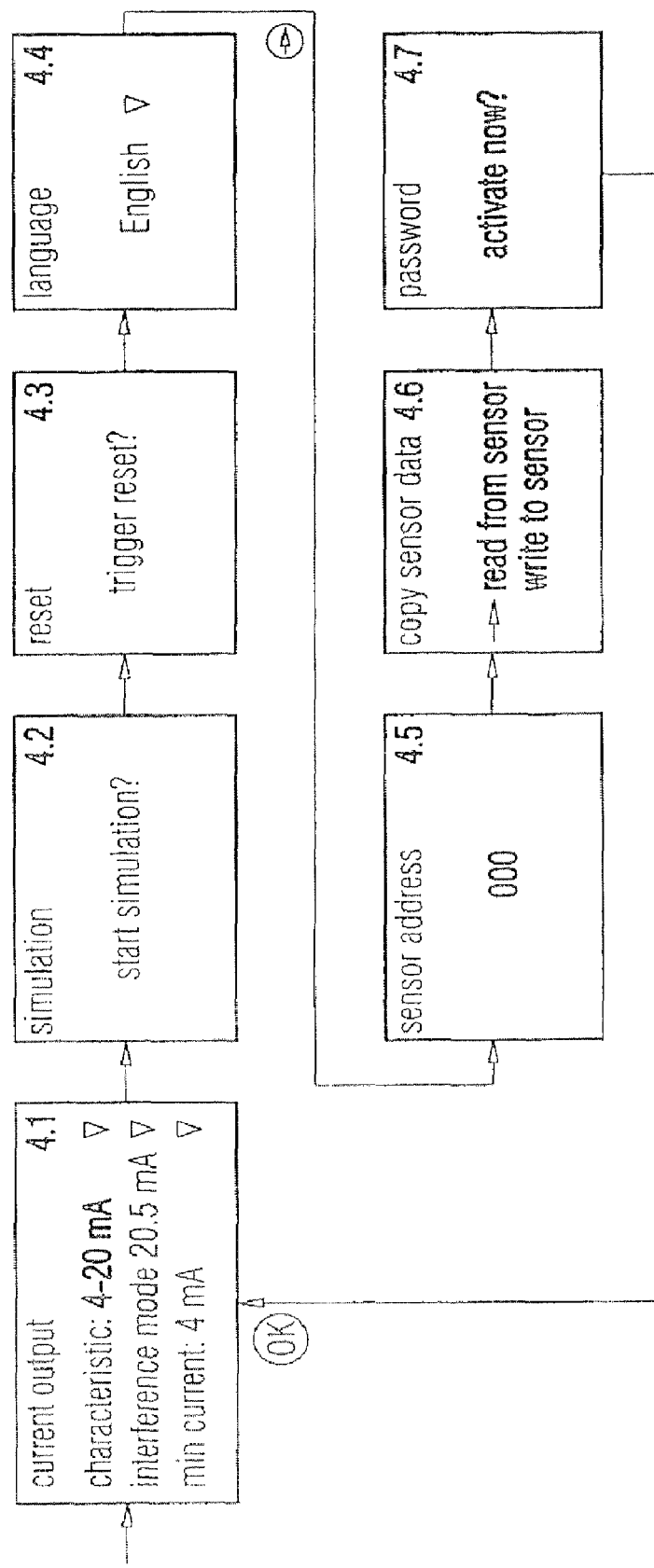
FIG. 12d shows a further submenu of the overview shown in FIG. 12.
Figure 12E:
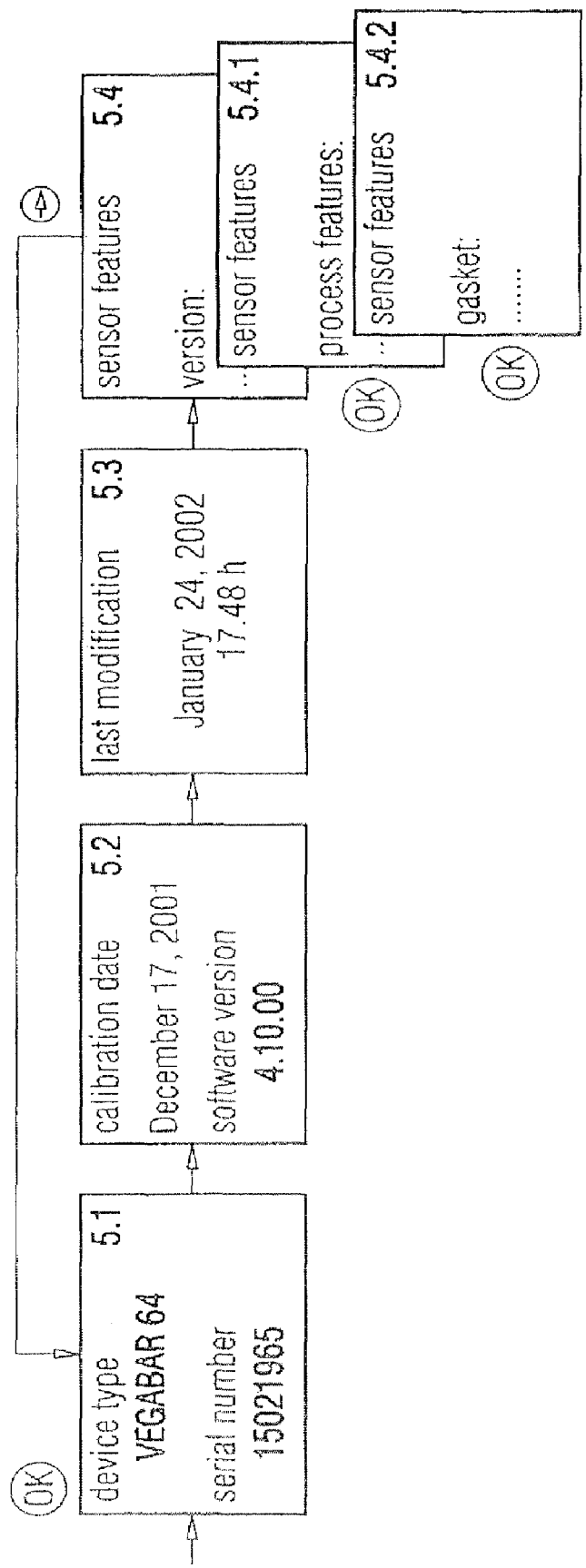
FIG. 12e shows a further submenu of the overview shown in FIG. 12.
Figure 13:
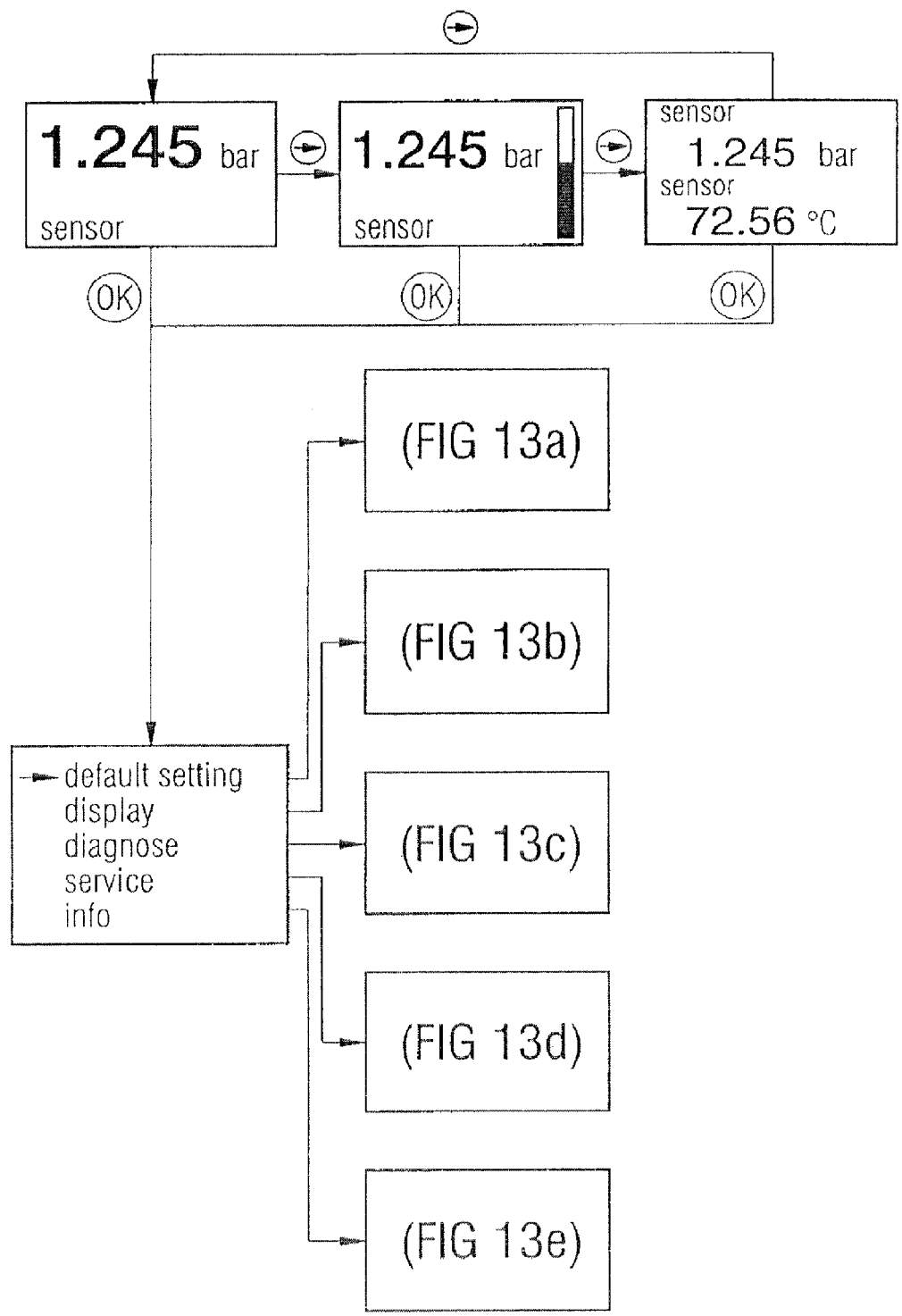
FIG. 13 shows a further overview of a menu structure of an exemplary embodiment of an apparatus according to the invention.
Figure 13A:
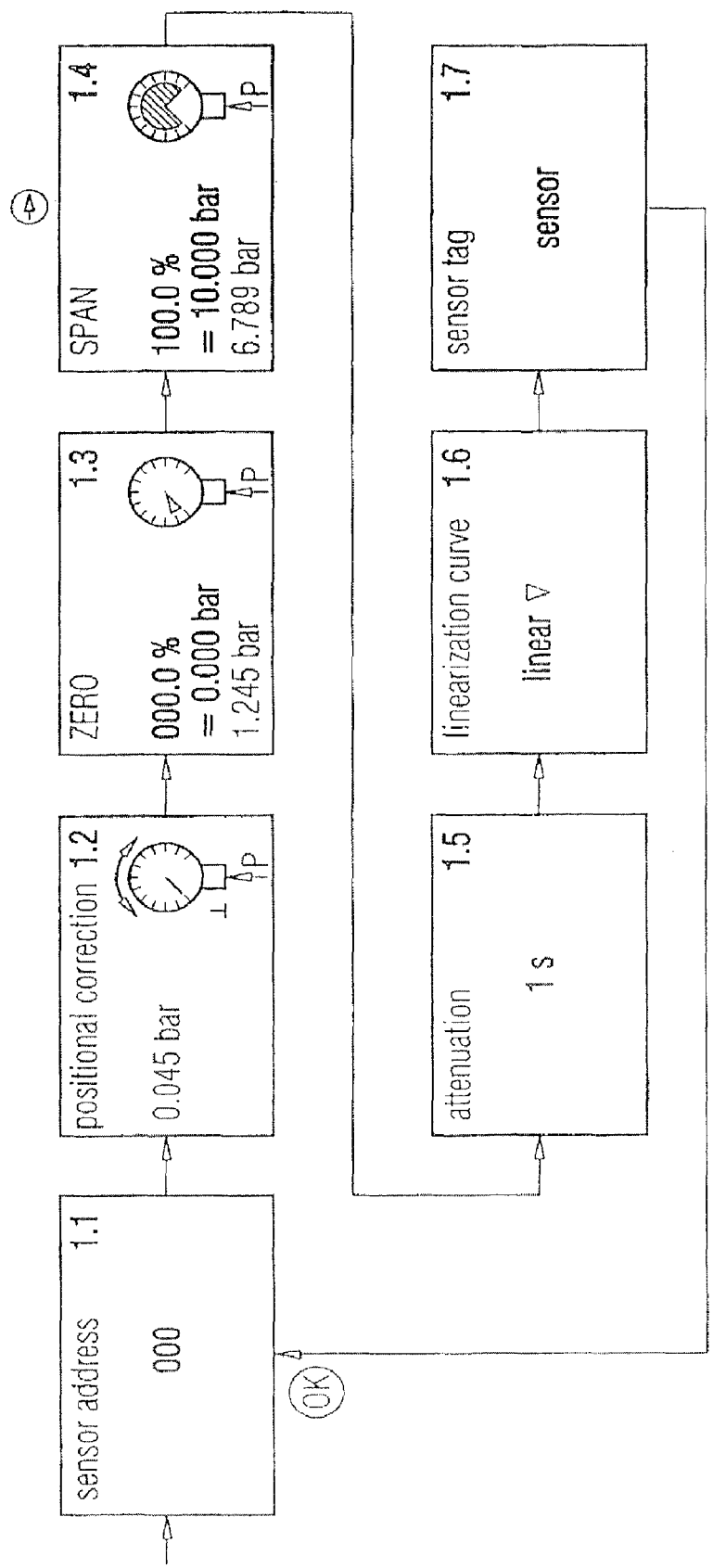
FIG. 13a shows a submenu of the overview shown in FIG. 13.
Figure 13B:
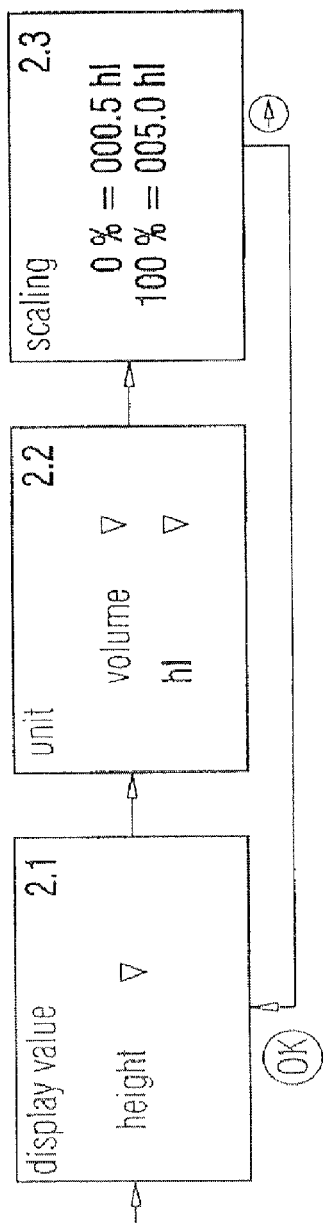
FIG. 13b shows a further submenu of the overview shown in FIG. 13.
Figure 13C:
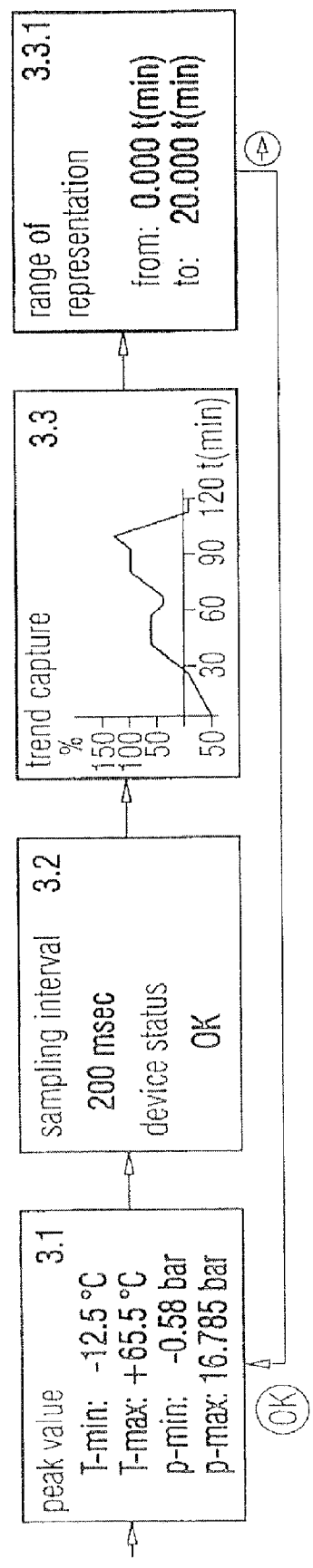
FIG. 13c shows a further submenu of the overview shown in FIG. 13.
Figure 13D:
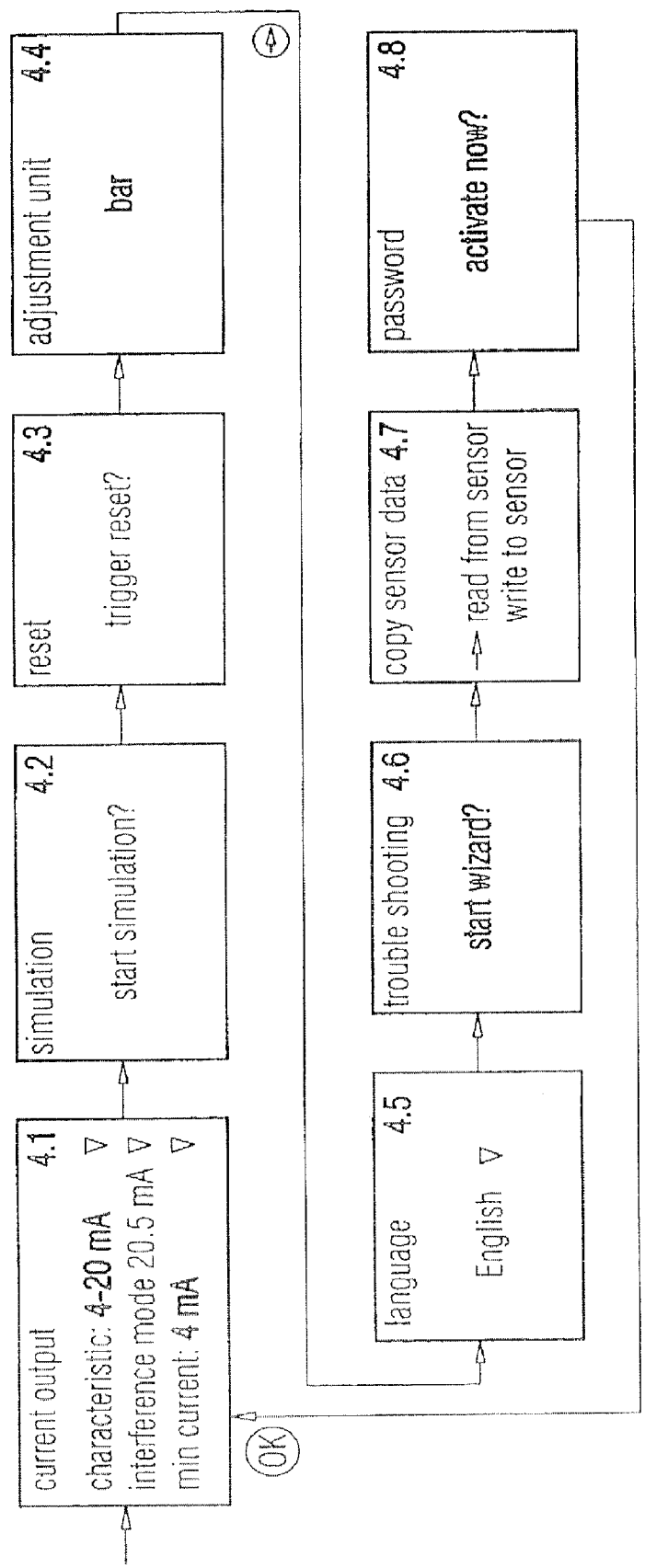
FIG. 13d shows a further submenu of the overview shown in FIG. 13.
Figure 13E:
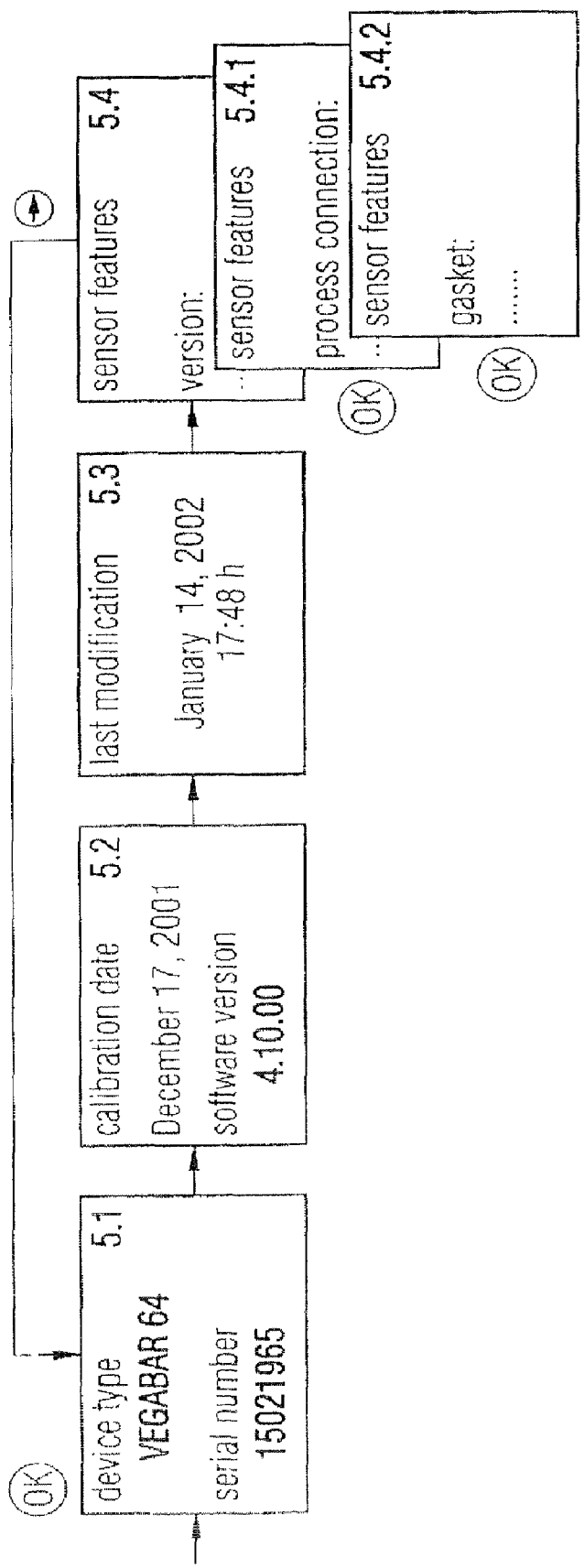
FIG. 13e shows a further submenu of the overview shown in FIG. 13.
Figure 14:
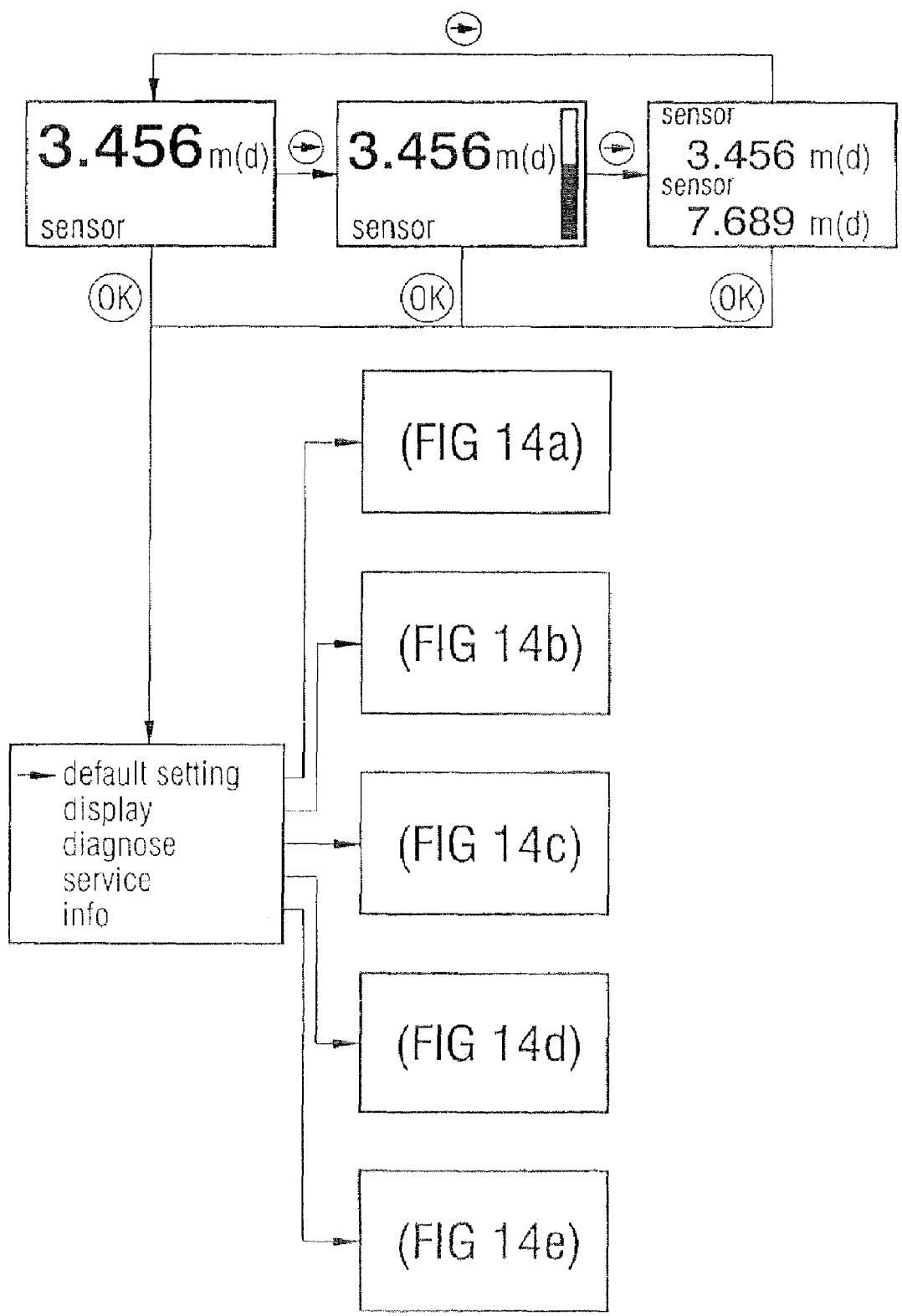
FIG. 14 shows a further overview of a menu structure of an exemplary embodiment of an apparatus according to the invention.
Figure 14A:
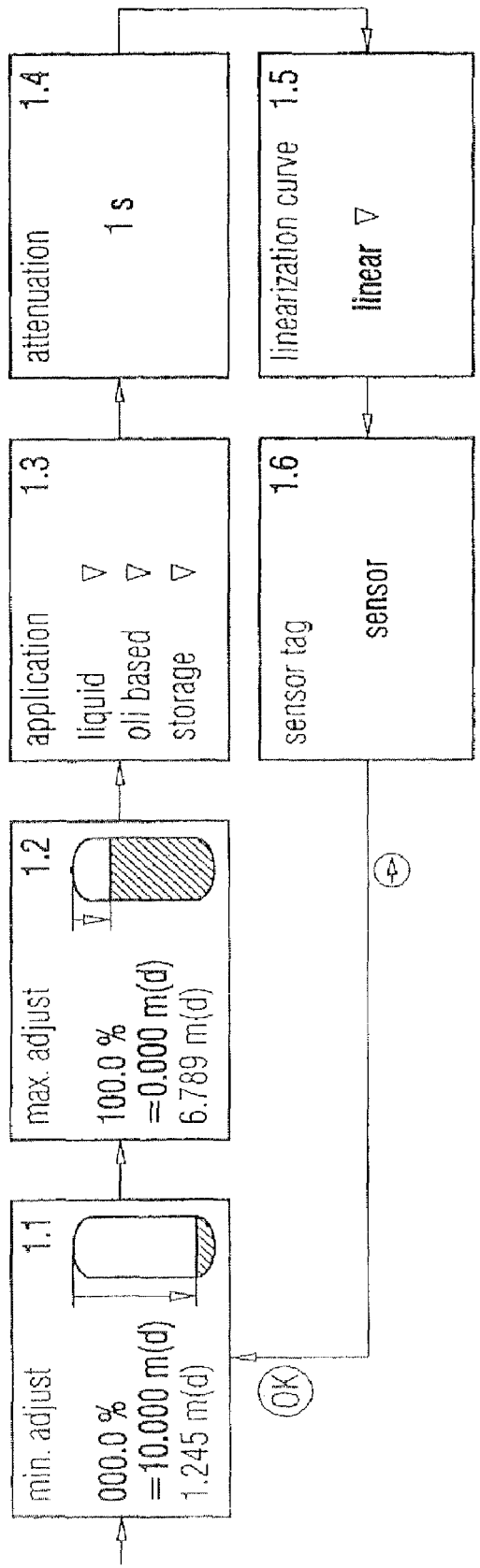
FIG. 14a shows a submenu of the overview shown in FIG. 14.
Figure 14B:
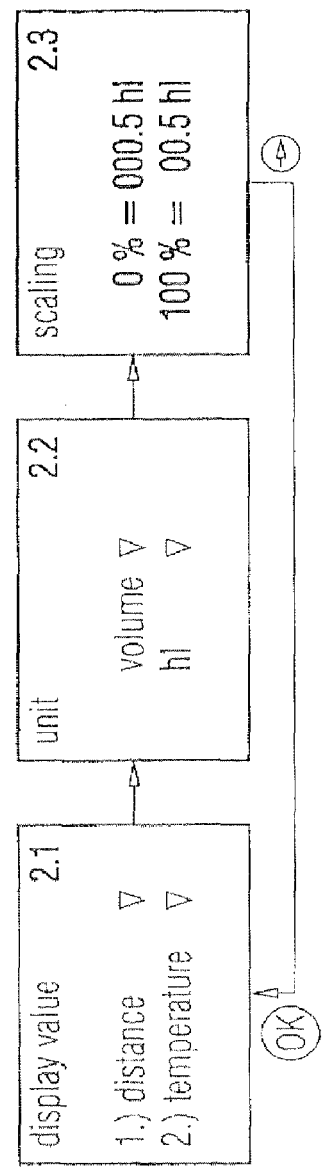
FIG. 14b shows a further submenu of the overview shown in FIG. 14.
Figure 14C:
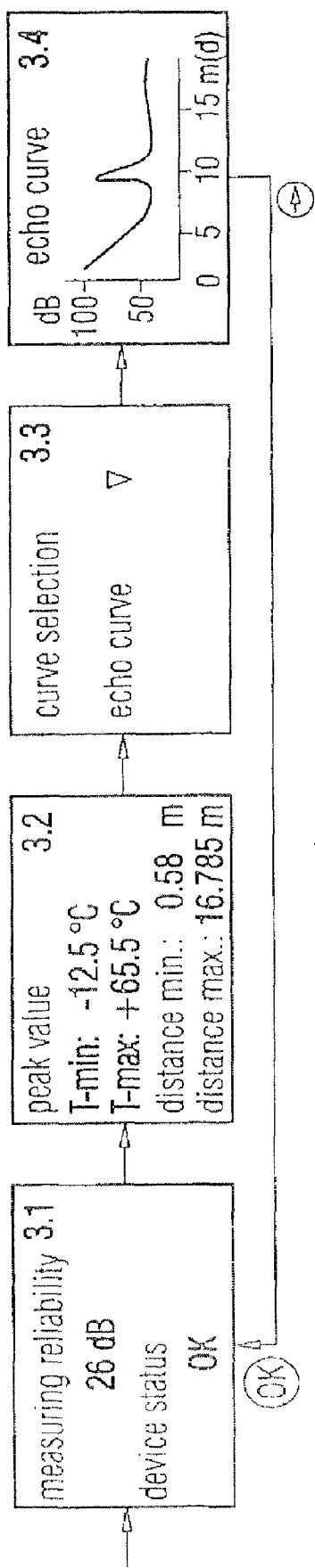
FIG. 14c shows a further submenu of the overview shown in FIG. 14.
Figure 14D:
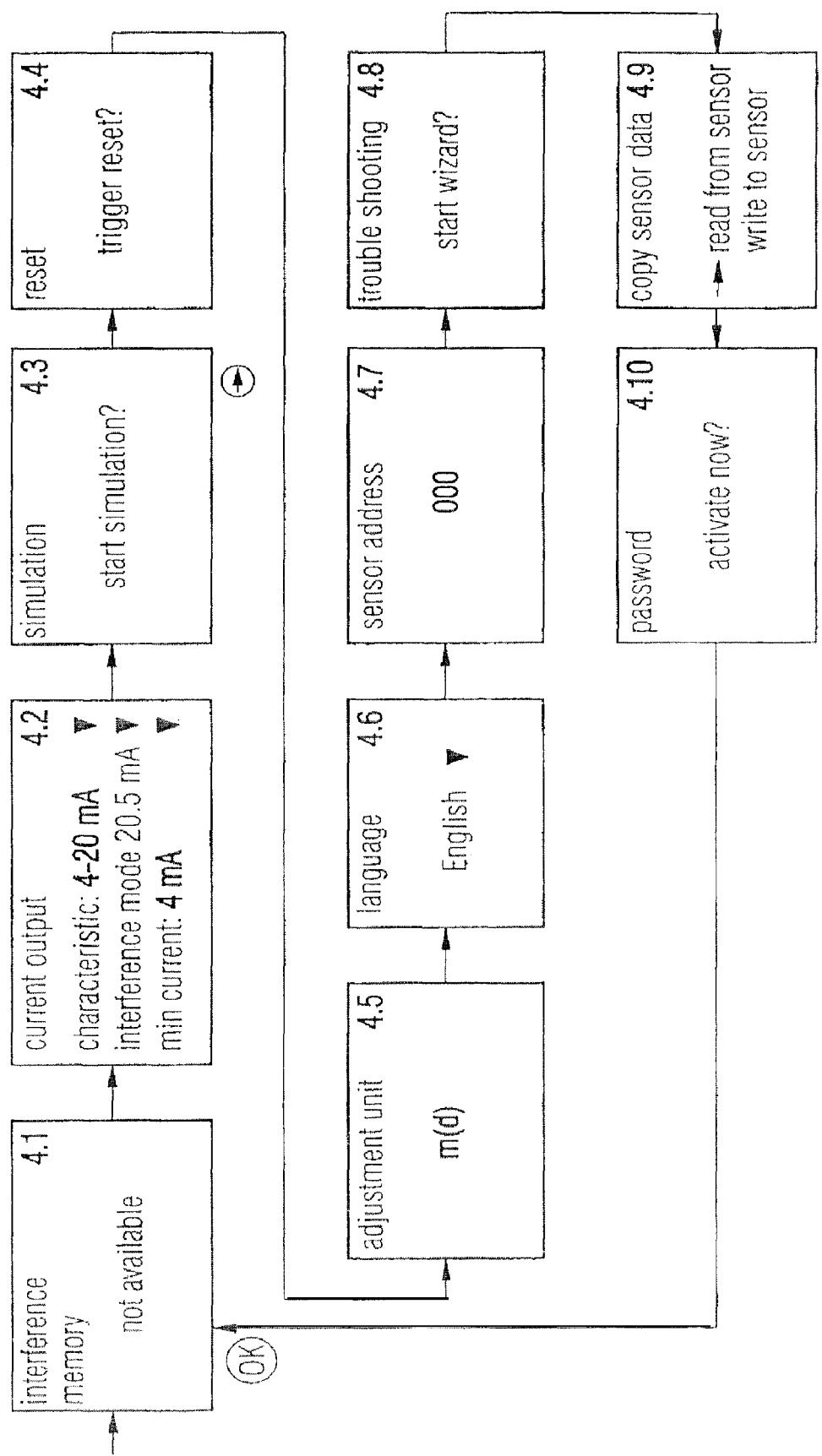
FIG. 14d shows a further submenu of the overview shown in FIG. 14.
Figure 14E:
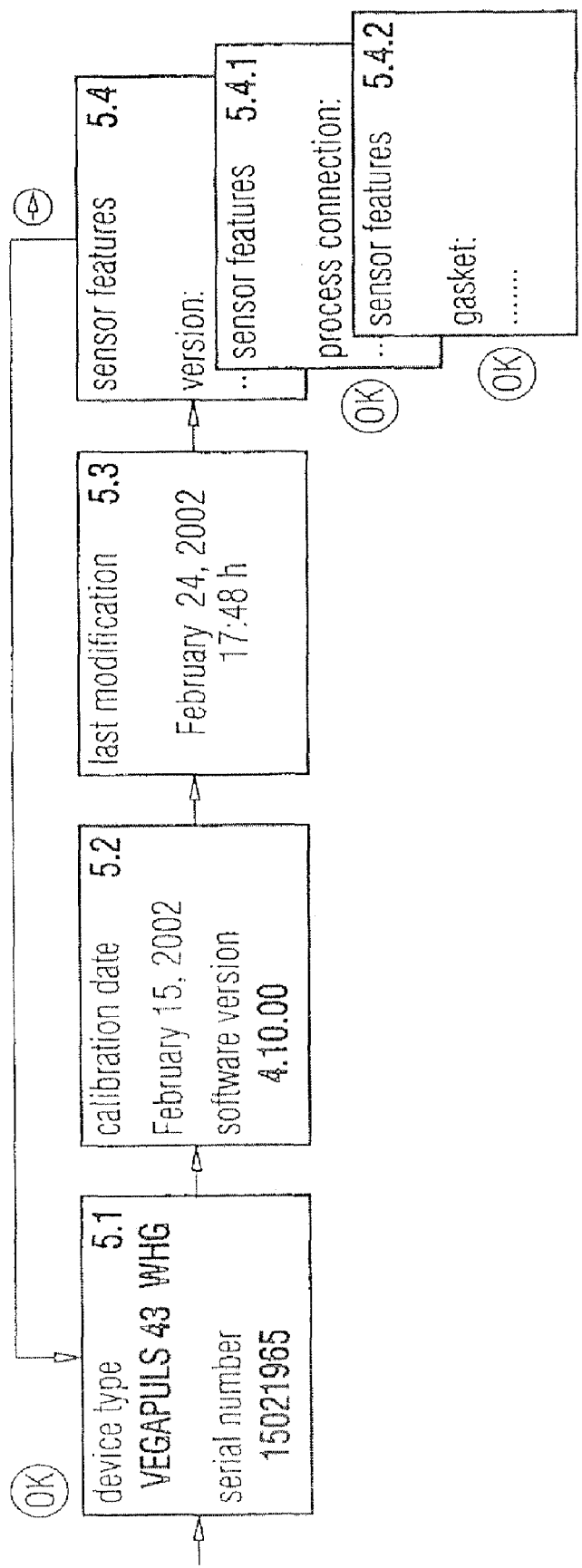
FIG. 14e shows a further submenu of the overview shown in FIG. 14.
Figure 15:
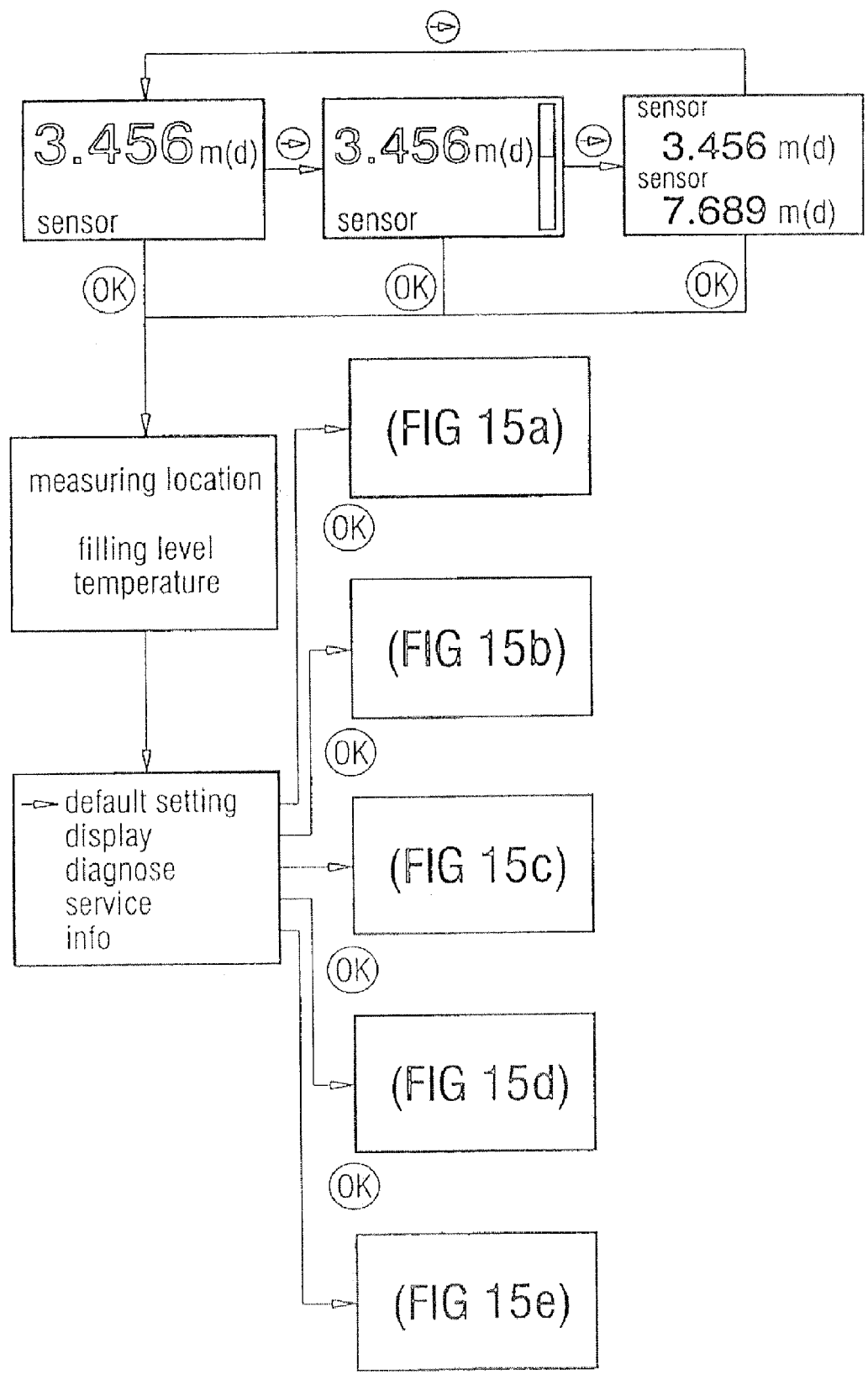
FIG. 15 shows a further overview of a menu structure of an exemplary embodiment of an apparatus according to the invention.
Figure 15A:
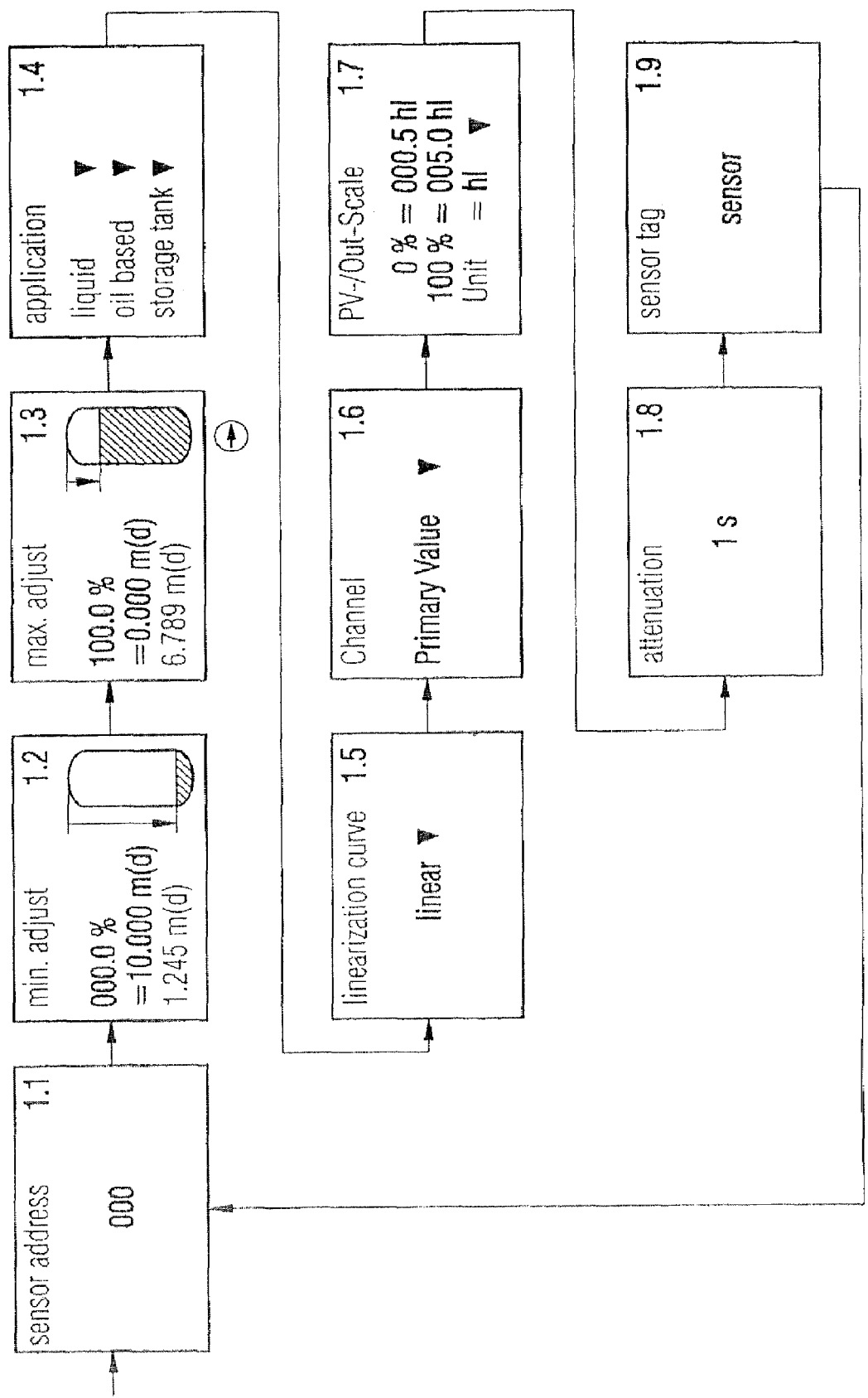
FIG. 15a shows a submenu of the overview shown in FIG. 15.
Figure 15B:
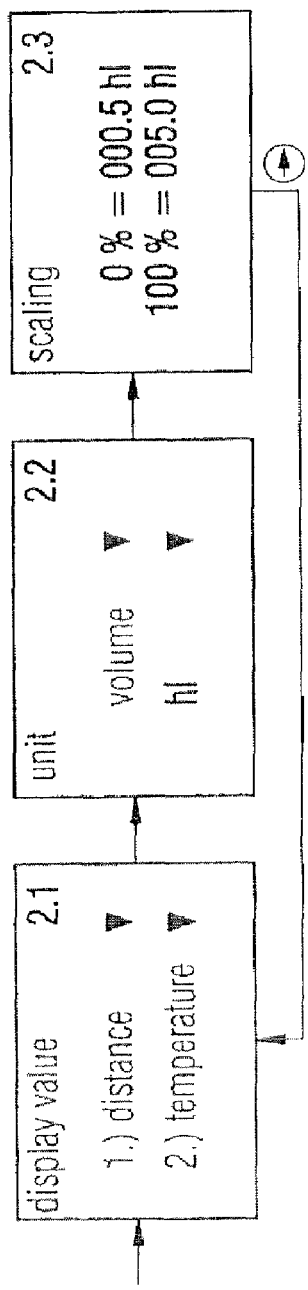
FIG. 15b shows a further submenu of the overview shown in FIG. 15.
Figure 15C:
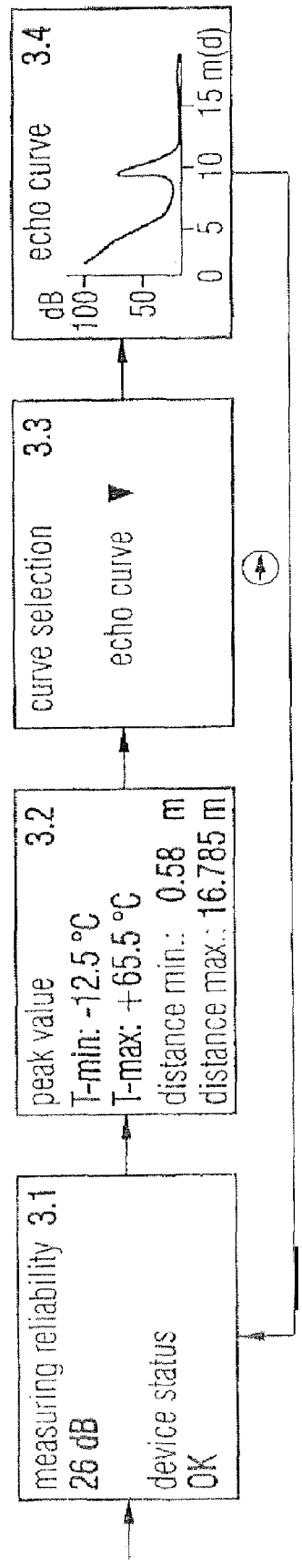
FIG. 15c shows a further submenu of the overview shown in FIG. 15.
Figure 15D:
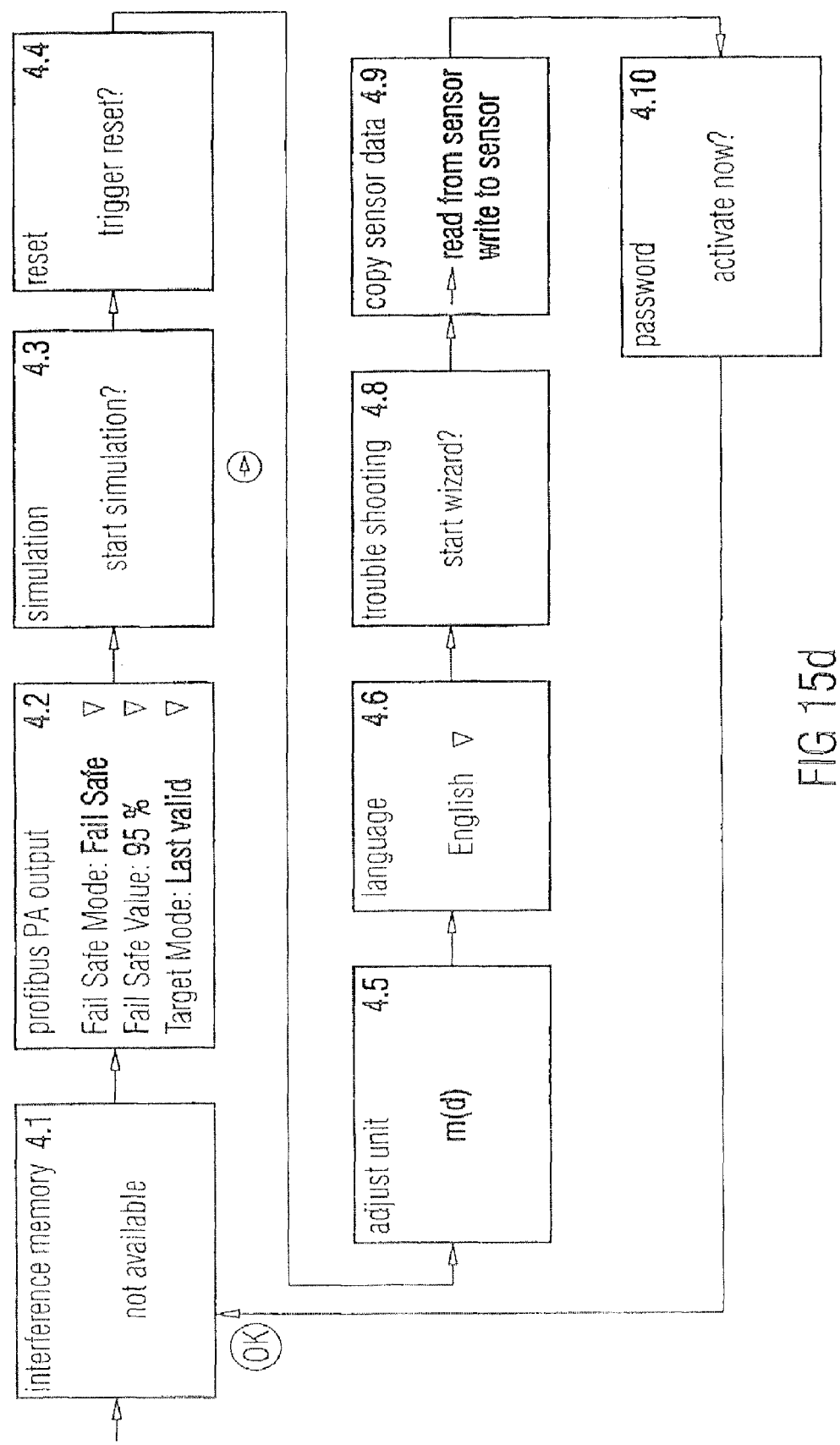
FIG. 15d shows a further submenu of the overview shown in FIG. 15.
Figure 15E:
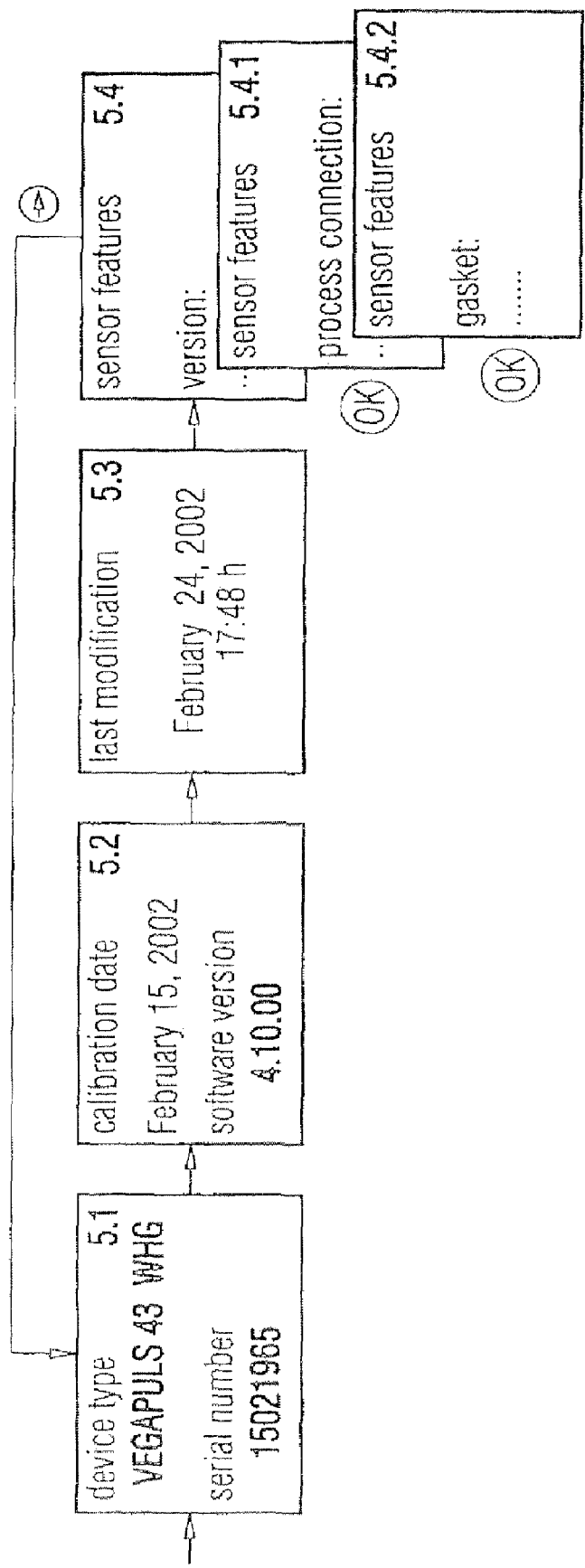
FIG. 15e shows a further submenu of the overview shown in FIG. 15.

FIGS. 10-15 show operating structures of different exemplary apparatuses for determining a physical process quantity according to the present invention are shown. In FIG. 10 the basic operating structure of an ultrasonic filling level sensor is represented. FIG. 11 illustrates the operating structure of a TDR filling level sensor. In FIG. 12 the operating structure of a pressure measurement sensor having a HART connection is shown. FIG. 13 illustrates the operating structure of a pressure measurement sensor with a Profibus PA connection. The operating structures according to FIGS. 12 and 13 are thus only distinguished by their respective bus connections. FIG. 14 shows the operating structure of a radar filling level measuring device, and FIG. 15 finally also shows an operating structure for a radar filling level measuring sensor, including, however, a Profibus PA connection.

The operating structure according to FIG. 10 illustrates a basic menu structure that can also be found in the other operating structures. The operating structure consists of "default setting", "display", "echo curve", "service" and "info". These individual submenus are shown in more in detail in the individual FIGS. 10a-10e. The same applies to the further operating structures according to FIGS. 11-15. From a comparison of these individual operating structures, it can be seen that the menu structure is basically the same for all sensors, which simplifies the operation for a user having to operate different sensors by providing a high recognition value regardless of the sensor, which may also be based on differing measuring principles. Moreover for example with the operating structures shown in FIGS. 10 and 11 and the associated submenus as shown in FIGS. 10a-e and FIGS. 11a-e, the displays "min adjust" and "max adjust" as well as the display "attenuation" and further submenu displays are identical. The same also applies to the further operating structures according to the remaining figures. In particular the display "info" is always structured in the same manner.

Figure 16:
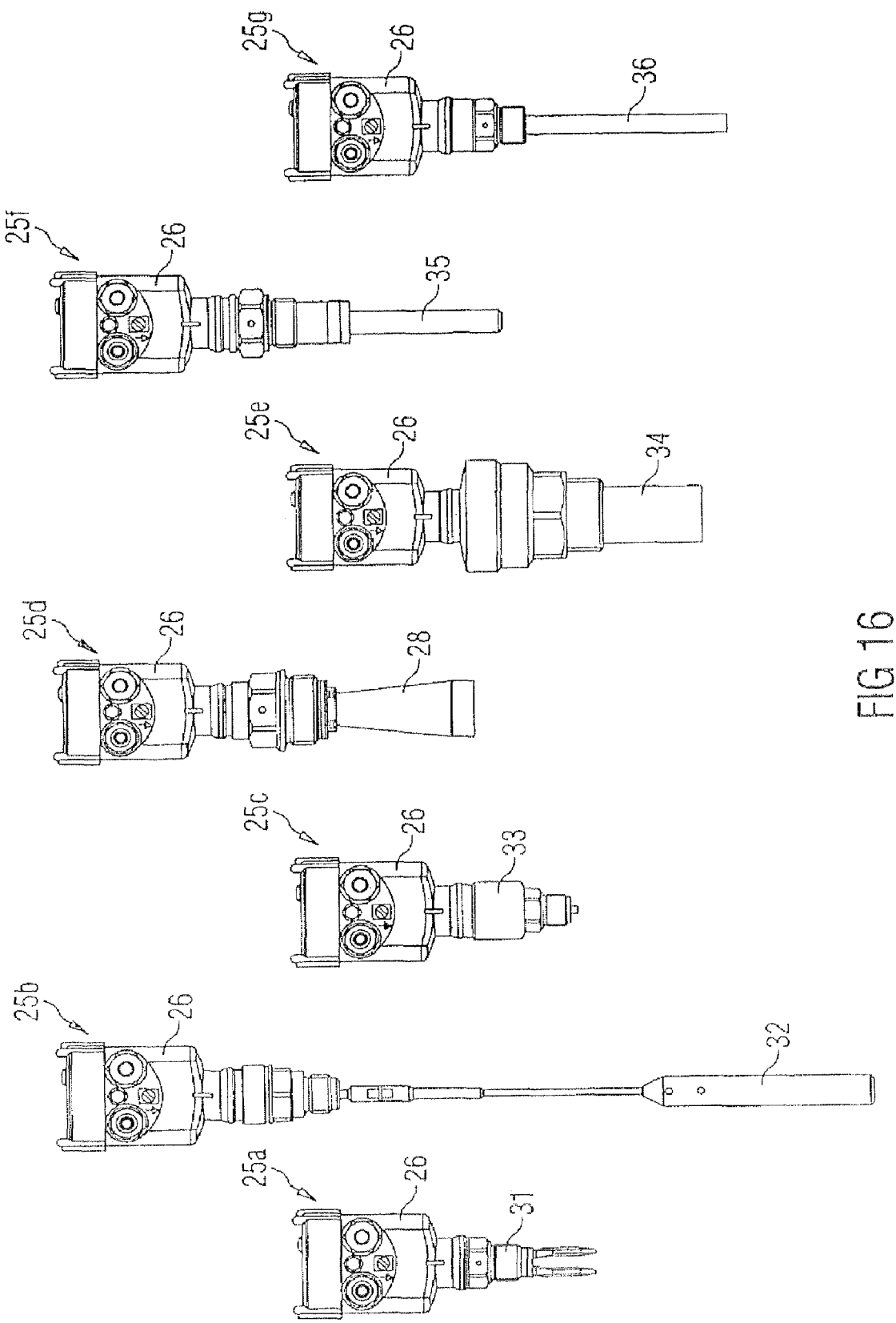
FIG. 16 shows an overview over several apparatuses for determining a physical process quantity having different sensor units some of whom are based on differing measuring principles.

FIG. 16 shows a schematic overview of different sensors for determining a physical process quantity. On the left there is a vibration limit switch 25a with a tuning fork 31. The vibration limit switch 25a comprises a housing 26. As can be seen from FIG. 16, the housing 26 may also be used with other sensors 25b-25g. The present housing 26 is a one-chamber housing. On this housing 26, the input and output device 19 is detachably mounted by means of a cover. The housing 26 can be of different materials. It can be, for example, a plastics housing, a V4A housing or an aluminium housing, depending on the application.

The second electronic device from the left is a TDR filling level sensor 25b with a carrying portion 32 and a weight, along which carrying portion a microwave is guided and transmitted to the filling matter, and reflected echoes are passed back to the device. The electronic device 25b also has a housing 26 for accommodating an input and output device with a cover. The electronic device 25c to the right of the above-mentioned electronic device 25b is a pressure sensor again having the same housing 26 for mounting an input and output device and a cover.

To the right of the pressure sensor 25c, a filling level radar sensor 25d is shown having a horn antenna 28. Again the housing 26 is configured in the manner as described before. To the right of the filling level radar 25d, a further filling level radar 25e is illustrated equipped with a different antenna 34 (fully encased antenna). The housing 26 is configured as in the case of the filling level radar 25d.

Further to the right, a limit level detection sensor 25f with a vibration rod is shown. Again the housing 26 has the above-mentioned structure including a cover.

Finally, rightmost in FIG. 16, a capacitive filling level sensor 25g is shown comprising a rod 36. Again, the filling level sensor is equipped with the housing 26 of the above described structure.

It can thus be clearly seen that all different measuring principles and the associated sensors may be equipped with one and the same housing 26.

To conclude, it may be observed that apart from the identical housing configuration for different sensors, the operating structures for the different sensors 25a-25g may also have a basically identical menu structure regardless of the measuring principle of each sensor. The submenus and the individual displays contained therein may also be designed to be as similar as possible, only partially extended or adapted to the specific application in a particular sensor. The menu structure is thus always basically either the same or similar. The presentation of the display also has a high recognition value regardless of the basic device whose values or data are to be displayed.

The present invention relates to a system for manufacturing different versions of a modularly structured apparatus for determining a physical process quantity, wherein at least two devices to be generated from the system are based on different measuring principles, comprising a number sensor units (41-48), each sensor unit (41-48) being designed for detecting a determined physical measuring quantity and for converting said measuring quantity into an electrical measuring signal, and wherein at least two of the number of sensor units (41-48) are distinguished from each other by their underlying measuring principles; at least one evaluation unit (10) for evaluating and generating a process quantity signal representing the physical process quantity from the measuring signal of a sensor unit (41-48), wherein the evaluation unit (41-48) is configured and standardized for connection to one or more of the sensor units (41-48); at least one output unit (13) for outputting the process quantity signal, the output unit (13) being configured and standardized to be connected to one or more of said evaluation units (10); at least one voltage supply unit (16) for supplying voltage to the apparatus for determining a physical process quantity; at least one housing unit (22-24) configured and standardized to accommodate one or more units from the group of units comprising at least said evaluation unit (10), said output unit (13) and said voltage supply unit (16); and a number of attachment units (31-33) for attaching the apparatus for determining a physical process quantity at a vessel or wall portion, the attachment units (31-33) being different with respect to conditions on each vessel or wall portion. At least one unit from the group of units comprising said evaluation unit (10), said output unit (13), said voltage supply unit (16), said housing unit (22-24) and said attachment unit (31-33) is configured and standardized in such a way that it is usable in at least two different apparatuses for determining a physical process quantity having different sensor units distinguished by the measuring principle they are based upon.

What is claimed:

1. A kit for assembling an assemblable modularly structured filling level measurement apparatus, comprising:
    a plurality of filling level sensor units including a first sensor unit and a second sensor unit, the first sensor unit configurable to detect a specified physical measurement quantity and to convert the measurement quantity into an electrical measurement signal, the first and second sensor units being based on different measuring principles;
    at least one evaluation unit configurable to evaluate and generate, based on the electrical measuring signal, a process quantity signal representing a physical measurement quantity detectable by any one of the filling level sensor units, the evaluation unit being configured and standardized to be connectable to any one of the filling level sensor units;
    at least one output unit configurable to output the process quantity signal, the output unit being configured and standardized to be connectable to the at least one evaluation unit;
    at least one voltage supply unit configurable to supply voltage to the assemblable apparatus, the voltage supply unit being configured and standardized to supply voltage to any one of assemblable versions of the modular apparatus;
    at least one housing unit configured and standardized to accommodate at least one unit from the group of units including the evaluation unit, the output unit and the voltage supply unit; and
    a plurality of different attachment units configurable to attach the assemblable apparatus to one of vessels and wall portions thereof, each of the attachment units being adapted to fit different ones of one of the vessels and the wall portions,
    wherein the kit is capable of being assembled to form different versions of the measurement apparatus having different ones of the filling level sensor units, and
    wherein different measuring principles are selectable from the group consisting of: (a) delay measurement of one of freely radiated waves and guided waves reflected on a filling matter, the waves including one of electromagnetic waves and ultrasonic waves, (b) measurement of a capacitance of a filling matter, (c) measurement of one of a pressure and a differential pressure, (d) limit level measurement using of vibration in a conductive way, and (e) temperature measurement.

2. The kit according to claim 1, further comprising:
    a plurality of specific sensor electronics units electronically processing the electrical measuring signal of specific ones of the filling level sensor units to obtain a standardized digital measuring signal suitable to be converted by the evaluation unit into the process quantity signal, wherein different ones of the sensor electronics units are configured and standardized to be connectable to the first and second sensor units.

3. The kit according to claim 2, wherein one of the sensor electronics units and the evaluation unit are integrable into a single module.

4. The kit according to claim 2, wherein one of the sensor electronics units and the evaluation unit are arranged on at least one printed circuit board.

5. The kit according to claim 1, wherein the housing unit is coupled with any one of the filling level sensor units.

6. The kit according to claim 5, wherein the housing unit includes connection configurations for remote transmission links.

7. The kit according to claim 1, wherein one of the filling level sensor units is selected from the group comprising a plurality of the following components:
   a) a horn, rod or patch antenna and associated electronics transmitting and receiving microwaves,
   b) a sound transducer and associated electronics transmitting and receiving ultrasonic waves,
   c) a cable or rod probe and associated electronics guiding microwaves,
   d) a tuning fork and associated electronics,
   e) a capacitive measuring probe and associated electronics,
   f) a temperature sensor and associated electronics,
   g) a pressure measuring cell and associated electronics,
   h) a differential pressure measuring cell and associated electronics for transmitting.

8. The kit according to claim 1, wherein the output unit digital communicates with a bus system.

9. The kit according to claim 1, wherein the output unit outputs the process quantity using a two-wire technology.

10. The kit according to claim 1, wherein the output unit signals the process quantity using a relay.

11. The kit according to claim 1, wherein the at least one voltage supply unit includes first and second voltage supply units, the first and second voltage supply units being arranged for one of a two-wire technology, a four-wire technology and coupling with a bus system, each of the first and second voltage supply units having different standardized dimensions adapted to different ones of the different versions of the modular apparatus.

12. The kit according to claim 1, wherein the at least one voltage supply unit includes first and second voltage supply units, the first and second voltage supply units being connected in series, each of the first and second voltage supply units being supplied with a voltage of one of 3V and 5V.

13. The kit according to claim 1, further comprising:
   at least one further housing unit; and
   a display and operating module detachably mounted on the at least one further housing unit.

14. The kit according to claim 13, wherein the display and operating module includes an attachment arrangement and an electrical connection arrangement, the attachment arrangement being coupled with a standardized receiving arrangement of the housing unit, the electrical connection arrangement being paired with a corresponding electrical connection arrangement of the housing unit.

15. The kit according to claim 13, wherein the display and operating module is detachably mounted in different one of positions and orientations on the housing unit.

* * * * *